US012583354B2

(12) United States Patent
Sujan et al.

(10) Patent No.: US 12,583,354 B2
(45) Date of Patent: Mar. 24, 2026

(54) CHARGER PEAK POWER OPTIMIZATION FOR FLEET DEPOT

(71) Applicant: Cummins Inc., Columbus, IN (US)

(72) Inventors: Vivek A. Sujan, Columbus, IN (US);
Joseph P. Chandraraj, Columbus, IN
(US); Emrah Arslanturk, Indianapolis,
IN (US); Thanigasalam Chettiyar,
Naperville, IN (US); **Vinayak
Mandavkar**, Columbus, IN (US)

(73) Assignee: Cummins Inc., Columbus, IN (US)

( * ) Notice: Subject to any disclaimer, the term of this
patent is extended or adjusted under 35
U.S.C. 154(b) by 958 days.

(21) Appl. No.: 17/701,962

(22) Filed: Mar. 23, 2022

(65) Prior Publication Data

US 2022/0348106 A1     Nov. 3, 2022

Related U.S. Application Data

(63) Continuation-in-part of application No. 17/246,605,
filed on May 1, 2021, now Pat. No. 12,233,739.

(51) Int. Cl.
B60L 53/67          (2019.01)
B60L 53/63          (2019.01)
(Continued)

(52) U.S. Cl.
CPC .............. B60L 53/67 (2019.02); B60L 53/63
(2019.02); B60L 53/64 (2019.02); B60L 53/65
(2019.02); B60L 53/66 (2019.02)

(58) Field of Classification Search
CPC .......... B60L 53/67; B60L 50/50; B60L 50/53;
B60L 53/62; B60L 53/63; B60L 53/64;
(Continued)

(56) References Cited

U.S. PATENT DOCUMENTS 6,850,898 B1     2/2005   Murakami et al.
8,935,112 B2     1/2015   Lowenthal et al.
(Continued)

FOREIGN PATENT DOCUMENTS

CN          110198042 A     9/2019
IN          109117503 A     1/2019
(Continued)

*Primary Examiner* — David V Henze-Gongola
(74) *Attorney, Agent, or Firm* — Faegre Drinker Biddle &
Reath LLP

(57)          ABSTRACT

An electrified vehicle with a powertrain is disclosed, com-
prising: a battery; and a controller configured to be in
communication with a plurality of electric vehicles. The
controller including a processor and a non-transient com-
puter readable storage medium comprising instructions. The
instructions cause the vehicle to determine a plurality of
characteristics of the electrified vehicle; determine a plural-
ity of characteristics of a plurality of chargers, determine a
plurality of characteristics of each of a plurality of charging
depots; process the plurality of characteristics of the elec-
trified vehicle, the plurality of characteristics of each of the
plurality of chargers, and the plurality of characteristics of
multiple charging depots to identify charging opportunities
for the electrified vehicle over the course of a time period;
perform a multiple charging depot optimization analysis to
generate a power grid peak hour profile; and perform a peak
power optimization analysis to generate a vehicle charging
profile.

20 Claims, 16 Drawing Sheets

(51) Int. Cl.
    *B60L 53/64*         (2019.01)
    *B60L 53/65*         (2019.01)
    *B60L 53/66*         (2019.01)

(58) Field of Classification Search
    CPC .......... B60L 53/66; B60L 53/68; B60L 58/13;
                   B60L 2240/72; B60L 2260/52; B60L
                           2260/54; Y04S 10/14
    See application file for complete search history.

(56)                       References Cited

U.S. PATENT DOCUMENTS

| | | | |
|---|---|---|---|
| 9,112,382 B2 | 8/2015 | Paul et al. | |
| 2008/0258682 A1* | 10/2008 | Li | B60L 50/66 |
| | | | 320/109 |
| 2010/0179704 A1 | 7/2010 | Ozog | |
| 2011/0025267 A1* | 2/2011 | Kamen | B60L 53/665 |
| | | | 320/109 |
| 2012/0013299 A1 | 1/2012 | Prosser et al. | |
| 2012/0133337 A1 | 5/2012 | Rombouts et al. | |
| 2012/0330494 A1 | 12/2012 | Hendrix et al. | |
| 2018/0304760 A1 | 10/2018 | Chase et al. | |
| 2018/0307226 A1 | 10/2018 | Chase et al. | |
| 2019/0285425 A1 | 9/2019 | Ludwick et al. | |
| 2019/0389315 A1* | 12/2019 | Zhu | B60L 53/64 |
| 2021/0213848 A1* | 7/2021 | Sun | B60L 53/66 |
| 2021/0221247 A1* | 7/2021 | Daniel | B60L 55/00 |
| 2022/0348105 A1 | 11/2022 | Sujan et al. | |

FOREIGN PATENT DOCUMENTS

| | | |
|---|---|---|
| KR | 10-1505744 B1 | 4/2015 |
| WO | 2012/072679 A1 | 6/2012 |

\* cited by examiner

50

| System or Mode | Peak Power Optimization | Avoid Peak Demand | Gid to SES Device | SES Device To Grid |
|---|---|---|---|---|
| Low Intelligence | YES | NO | NO | NO |
| Low-Med Intelligence | YES | YES | NO | NO |
| Medium Intelligence | YES | YES | YES | NO |
| High Intelligence | YES | YES | YES | YES |

| System or Mode | Peak Power Optimization | Avoid Peak Demand | Gid to SES Device | SES Device To Grid | Vehicle to Vehicle Charging | Multiple Terminal Optimization |
|---|---|---|---|---|---|---|
| Low Intelligence | YES | NO | NO | NO | NO | NO |
| Low-Med Intelligence | YES | YES | NO | NO | NO | NO |
| Medium Intelligence | YES | YES | YES | NO | NO | NO |
| High Intelligence | YES | YES | YES | YES | NO | NO |
| Ultra Intelligence | YES | YES | YES | YES | YES | YES |

FIG. 15

CHARGER PEAK POWER OPTIMIZATION FOR FLEET DEPOT

CROSS-REFERENCE TO RELATED APPLICATIONS

This application is a continuation-in-part application that claims the benefit of priority to commonly-owned U.S. Nonprovisional application Ser. No. 17/246,605 filed on May 1, 2021, the entire disclosures of which being expressly incorporated herein by reference.

FIELD

Disclosed embodiments relate generally to methods and systems for charging electric vehicles, and more particularly to methods and systems for improving charging efficiency and energy costs for maintaining a charged fleet of electric vehicles.

BACKGROUND

Various types of organizations like transit authorities maintain and operate fleets of electric vehicles which need periodic charging (e.g., all-electric, hybrid electric, etc.). Often these vehicles operate on known, often fixed, schedules and travel the same or similar routes on any given day (hereinafter called "missions"). Different vehicles in the fleet may have different missions. Consequently, some vehicles may be returned to the fleet operator depot for charging while other vehicles are running their missions. The vehicles may also have different amounts of energy storage (i.e., battery systems having different capacities).

The depots for storing and charging the vehicles may have a plurality of vehicle chargers of differing capacity connected to the power grid. Some depots may further include stationary energy storage devices connected to the grid for storing energy for charging the vehicles. The number of vehicle chargers may not be the same as the number of vehicles in the depot in need of a charge. It is known that the greater the number of devices being charged (e.g., vehicles and stationary energy storage devices), the higher the peak power demand from the grid. A high peak power demand results in high cost of operation. It is also known that the price of electricity from the grid fluctuates during the day, being highest during peak demand hours. Charging vehicles using power from the grid during peak demand hours also increases the cost of operation.

As such, it is desirable to provide a charging method and system which provides vehicle charging necessary to complete the required missions while reducing the cost of operation of the fleet of vehicles.

SUMMARY

In an example, the present disclosure provides an electrified vehicle with a powertrain. The electrified vehicle powertrain comprises a battery and a controller configured to be in communication with a plurality of electric vehicles. The controller includes a processor and a non-transient computer readable storage medium. The non-transient computer readable storage medium comprises instructions that, when executed by the processor, cause the vehicle to: determine a plurality of characteristics of the electrified vehicle, the plurality of characteristics including a charge capacity of the battery of the electrified vehicle, a mission schedule for the electrified vehicle, and an ability to participate in vehicle to vehicle charging for the electrified vehicle; determine a plurality of characteristics of a plurality of chargers at a plurality of charging depots coupled to an electric power grid, the plurality of characteristics including a type of each charger and a charging capacity of each charger; determine a plurality of characteristics of each of the plurality of charging depots, the plurality of characteristics including when each charging depot reaches peak demand hours; process the plurality of characteristics of the electrified vehicle, the plurality of characteristics of each of the plurality of chargers, and the plurality of characteristics of multiple charging depots to identify charging opportunities for the electrified vehicle over the course of a time period, the charging opportunities including vehicle to vehicle charging between the electrified vehicle and at least one other electrified vehicle; perform a multiple charging depot optimization analysis to generate a power grid peak hour profile, the power grid peak hour profile being configured to minimize charging the electrified vehicle at any of the plurality of charging depots experiencing peak hour demand; and perform a peak power optimization analysis to generate a vehicle charging profile, the vehicle charging profile being configured to avoid activating chargers at charging depots experiencing peak demand hours and utilize vehicle to vehicle charging during peak demand hours.

Implementations of the present disclosure can include, among other things, any and all of the following features. In an aspect of this example, the controller can optionally determine an opportunity for the electrified vehicle to receive an excess charge at the charging depot, the excess charge being more charge than the battery of the electrified vehicle needs to perform the missions of the vehicle. In another aspect of the example, the controller can optionally determine an opportunity for vehicle to vehicle charging, the controller communicates to the electrified vehicle operator instructions on how to commence the vehicle to vehicle charging. In yet another aspect of this example, the instructions to commence vehicle to vehicle charging can optionally include: a determination of any excess charge the electrified vehicle may receive during charging at a charging depot; a location to meet one of a plurality of other electrified vehicles; and a determination of which vehicle is being charged and which vehicle is taking charge during the vehicle to vehicle charging. In another aspect of this example, the controller can optionally send out a signal to at least one of the plurality of other electrified vehicles when the electrified vehicle experiences an unexpected event. In a variant of this aspect, the unexpected event is any event that occurs during the electrified vehicle's mission schedule that requires more charge than the controller previously determined, such as sitting in traffic or road closure. Further, in another variant of this aspect, the signal is optionally a notification to at least one of the plurality of other electrified vehicles to initiate vehicle to vehicle charging to charge the electrified vehicle experiencing the unexpected event. In another aspect of this example, an optimized charging profile is created by combining the vehicle charging profile with the power grid peak hour profile. In a variant of this aspect of the example, the controller can optionally communicate to an operator of the electrified vehicle a schedule that conforms to the optimized charging profile, the optimized charging profile including: when to charge the electrified vehicle at one of the charging depots; which charger to charge the electrified vehicle on at the charging depots; how much charge to receive at the charging depots; and when to take part in vehicle to vehicle charging.

In another example, the present disclosure provides a method for charging a plurality of electric vehicles. The method for charging a plurality of electric vehicles comprises: determining a plurality of characteristics of each vehicle in a plurality of vehicles, the plurality of characteristics including a charge capacity of a battery system of each vehicle, a mission schedule for each vehicle, and an ability to participate in vehicle to vehicle charging for each vehicle; determining a plurality of characteristics of each charger in a plurality of chargers at a plurality of charging depots coupled to an electric power grid, the plurality of characteristics including a type of each charger and a charging capacity of each charger; determining a plurality of characteristics of each of the plurality of charging depots, the plurality of characteristics including when each charging depot reaches peak demand hours; processing the plurality of characteristics of each of the plurality of vehicles, the plurality of characteristics of each of the plurality of chargers, and the plurality of characteristics of multiple charging depots to identify charging opportunities for each of the plurality of vehicles over the course of a time period, the charging opportunities including vehicle to vehicle charging; performing a multiple charging depot optimization analysis to generate a power grid peak hour profile, the power grid peak hour profile being configured to minimize charging vehicles at any of the plurality of charging depots experiencing peak hour demand; and performing a peak power optimization analysis to generate a vehicle charging profile, the vehicle charging profile being configured to activate a minimum number of chargers simultaneously and to minimize downtimes of the plurality of chargers to thereby distribute the power demand from the electric power grid and result in an initial peak power demand.

Implementations of the present disclosure can include, among other things, any and all of the following features. Another aspect of this example further comprises monitoring the mission schedule of each vehicle in the plurality of vehicles, a state-of-charge ("SOC") of the battery system of each vehicle in the plurality of vehicles, and a status of each charging depot in the plurality of charging depots to determine a current peak power demand from the electric power grid at various times during the time period. In another aspect of this example, the method further comprises determining an expected energy level required for each mission of each vehicle in the plurality of vehicles by evaluating a plurality of characteristics corresponding to the mission. In yet another aspect of this example, the method further comprises determining peak demand times during the time period for each of the plurality of charging depots where electricity rates charged for electricity from the grid are increased relative to other rates charged during the time period, wherein the vehicle charging profile is further configured to minimize vehicles charging at a charging depot that is experiencing peak demand. In a variant of this aspect, the method further comprises determining a plurality of characteristics of a stationary energy storage ("SES") device coupled to the plurality of chargers and to the grid, and performing the multiple charging depot optimization and peak power optimization analysis by determining opportunities during the time period to use the SES device to power one or more vehicles chargers instead of the grid. In a variant of the previous variant, the method further comprises identifying opportunities during the time period to deliver energy from the SES device back to the grid at any of the plurality of charging depots experiencing peak demand.

In yet another example, the present disclosure provides a controller for determining a vehicle charging profile for use in charging a plurality of electric vehicles using a plurality of vehicle chargers at a plurality of charging depots that are coupled to an electric power grid. The controller comprises a processor and a memory storing software. The memory storing software which, when executed by the processor, causes the processor to: determine a plurality of characteristics of each of the plurality of vehicles, the plurality of characteristics including a charge capacity of a battery system of each vehicle, a mission schedule for each vehicle, and an ability to participate in vehicle to vehicle charging for each vehicle; determine a plurality of characteristics of each of the plurality of chargers, the plurality of characteristics including a type of each charger and a charging capacity of each charger; determine a plurality of characteristics of each of the plurality of charging depots, the plurality of characteristics including when each charging depot reaches peak demand hours; process the plurality of characteristics of each of the plurality of vehicles, the plurality of characteristics of each of the plurality of chargers, and the plurality of characteristics of the plurality of charging depots to identify charging opportunities for each of the plurality of vehicles over the course of a time period; perform a multiple charging depot optimization analysis to generate a power grid peak hour profile, the power grid peak hour profile being configured to minimize charging vehicles at any of the plurality of charging depots experiencing peak hour demand; and perform a peak power optimization analysis to generate a vehicle charging profile, the vehicle charging profile being configured to activate a minimum number of chargers simultaneously and to minimize downtimes of the plurality of chargers to thereby distribute the power demand from the electric power grid and result in an initial peak power demand.

Implementations of the present disclosure can include, among other things, any and all of the following features. In an aspect of this example, the processor can optionally determine a schedule to charge the plurality of vehicles by analyzing the plurality of characteristics of the vehicles, the plurality of characteristics of the plurality of chargers, and the plurality of characteristics of the charging depots to minimize activation of chargers during the peak demand times. In a variant of this aspect of the example, the processor further determines the schedule to charge the plurality of vehicles by determining when during the time period a vehicle can receive an excess charge to later give the excess charge to another vehicle in the plurality of vehicles. In another variant of this aspect of the example, the controller further comprises a stationary energy storage ("SES") device that is coupled to both the vehicle chargers and the grid and is in communication with the controller; wherein the controller instructs the SES device to give energy back to the grid during peak hours of the plurality of charging depots; and wherein the controller instructs the SES device to charge vehicles that need charging during peak hours of the plurality of charging depots. In a variant of the previous variant of the example, the controller can optionally identify each vehicle in the plurality of vehicles by a unique identifier; wherein the unique identifier corresponds to a plurality of vehicle characteristics.

It should be appreciated that in various embodiments the foregoing concepts, and additional concepts discussed below, may be arranged in any suitable combination. Further, other advantages and novel features of the present disclosure will become apparent from the following detailed description of various non-limiting embodiments when considered in conjunction with the accompanying figures.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings:

FIG. 3 is a table depicting the availability of certain operational features for systems or modes of operation having different intelligence levels according to the present disclosure;

FIG. 15 is a table, similar to FIG. 3, depicting the availability of certain operational features for systems or modes of operation having different intelligence levels according to the present disclosure.

DETAILED DESCRIPTION

Figure 1:
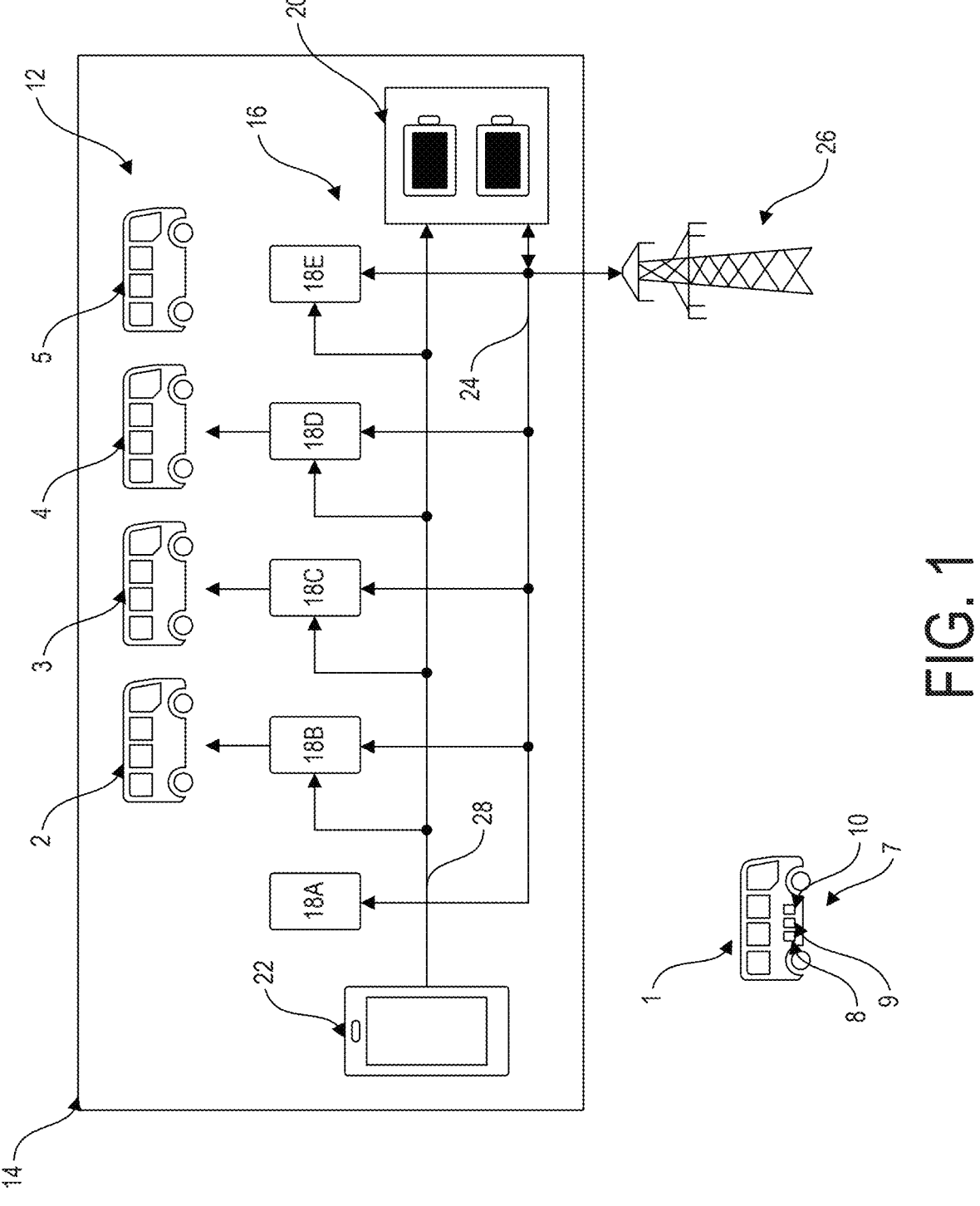
FIG. 1 is conceptual diagram of a depot for a fleet of electric vehicles.

FIG. 1 is a conceptual diagram of a fleet of vehicles and an associated vehicle depot charging infrastructure. In FIG. 1, five vehicles 1-5 are shown. It should be understood that the number of vehicles 10 depicted is arbitrary, and any number of two or more vehicles could be used with the teachings of the present disclosure. Vehicles 1-5 are electrified and are either hybrid electric or all electric vehicles. Any of the variety of different types of known hybrid electric or all electric vehicles may be used with the teachings of the present disclosure. Moreover, the vehicles 1-5 within the fleet 12 of vehicles may be of different types, and may have different battery size and capacity, and therefore different ranges.

The electrified vehicles all have similarities in their powertrains. It should be understood that the reference to elements on vehicle 1 applies to all of the plurality of vehicles 10. As seen in FIG. 1, vehicle 1 has a powertrain 7 that includes a prime mover 8, a battery (or series of batteries) 9, and a controller 10. The prime mover 8 can be a traction motor or other internal engine. Generally, the prime mover is similar to those already known in the art. The battery 9 can be a traction battery, which stores electricity for use by the electric traction motor. Some electric generators can perform both the drive and regeneration functions. The battery can include one or more cells that employ any of various suitable energy storage technologies such as lithium-ion batteries. The battery 9 provides the stored electricity to the prime mover to power the tires of the vehicle.

The controller 10 of FIG. 1 can be a standalone device or part of a system control module 200. Controller 10 can include a data processing system having memory, storage, processing and communication hardware, firmware and/or software. The data processing system can include a processor or a computer configured to access the memory. In this regard, exemplary procedures in accordance with the present disclosure described herein can be performed by a processing arrangement (e.g., one or more processors), a computing arrangement (e.g., one or more computers), or both. Such arrangements can be, e.g., entirely or a part of, or include, but not limited to, a computer, a processor, or both, each of which can include, e.g., one or more processors (e.g., CPUs or microprocessors), and use a non-transitory computer-readable medium (e.g., RAM, ROM, hard drive, or other storage device) with instructions stored thereon. Instructions, among other things, can be stored on a storage (e.g., HDD, SSD, etc.) that is in communication with the data processing system. In examples, the data processing system can be a server running a private cloud platform or a multi-tenant platform. Controller 10 can be a single device or a distributed device, and the functions of controller 10 can be performed by hardware and/or as computer instructions on a non-transient computer readable storage medium.

Each vehicle in the fleet of vehicles can be identified by a unique number identifier. The number identifier corresponds to a number of unique characteristics of the vehicle. For example, the unique number identifier can correspond to the routes of a vehicle, the mission schedule of the vehicle, the energy availability of the vehicle, and the energy needed to complete the mission schedule of the vehicle.

To provide an illustration of the concepts of the present disclosure, and not to limit the disclosure in any way, the systems and methods will primarily be described as applied to a fleet 12 of five vehicles 1-5 operated by a transit authority having a charging depot 14 with a particular charging infrastructure 16. In the example shown, charging infrastructure 16 includes five chargers 18A-E, a stationary energy storage ("SES") device 20 and a controller 22. The controller 22 can be similar to those discussed elsewhere herein, including the controller 10. As is further described below, chargers 18A-E and SES device 20 are selectively electrically coupled by power lines 24 to the electrical power grid, represented in FIG. 1 by the symbol numbered 26. As is also further described below, controller 22 controls the operation of chargers 18A-E and SES device 20 over communication lines 28. It should be understood, however, that communication between controller 22, chargers 18A-E and SES device 20 may alternatively, or in addition, be performed wirelessly.

It should be understood that charging vehicles 1-5 results in a power demand from grid 26. It is known that a lower peak grid demand results in a lower total cost of operation ("TCO") of the vehicles. Generally, for a transit authority that provides overnight charging and day time charging with no user intervention having a fleet size of m vehicles and charging infrastructure including i chargers and j plugs where i is less than or equal to m, the amount of peak power consumed from grid 26 at any time of day is a function of the charger power ratings and the number j of charger plugs that are active. This may be represented by Equation 1 below.

$$P_{PeakGridDemand}(t) := \Sigma_{n=1}^{i}(ChrgAct_i(t) * ChrgPwr_i) \qquad \text{Equation 1}$$

where $P_{PeakGridDemand}(t)$ is the peak power demand from grid 26 at a given time of day, $ChrgAct_i(t)$ is the number of chargers being active at the given time (1=active, 0=inactive), and $ChrgPwr_i$ is the power rating of the ith charger.

It should further be understood that if multiple chargers are activated simultaneously, the peak power demand from grid 26 will increase, leading to a higher TOC. Also, multiple chargers activated simultaneously may result in concentrated charging operations during certain times leading to higher charger idle times.

Referring back to FIG. 1, in the example described herein, each vehicle 1-5 has the same energy capacity of 400 kWH, although it should be understood that vehicles with different energy capacities may be used, and vehicles within fleet 12 may have different energy capacities.

Each of chargers 18A-E may be of a known or after-developed type. Each charger 18A-E may have a charging capacity of, for example, 50 KW, although chargers with different charging capacities may be used and chargers within charging infrastructure 16 may have different charging capacities. Each charger 18A-E may be powered by grid 26 and/or SES device 20 over power lines 24.

SES device 20 described in the example herein has an energy storage capacity of 500 KW, although it should be understood that SES devices 20 with different energy storage capacities may be used, and more than one SES device may be used in charging infrastructure 16

Controller 22 may form a portion of a processing subsystem including one or more computing devices having non-transient computer readable storage media, processors or processing circuits, and communication hardware. Controller 22 may be a single device or a distributed device, and the functions of the controller may be performed by hardware and/or by processing instructions stored on non-transient machine-readable storage media. Example processors include an application specific integrated circuit (ASIC), a field programmable gate array (FPGA), a digital signal processor (DSP), and a microprocessor including firmware. Example non-transient computer readable storage media includes random access memory (RAM), read only memory (ROM), flash memory, hard disk storage, electronically erasable and programmable ROM (EEPROM), electronically programmable ROM (EPROM), magnetic disk storage, and any other medium which can be used to carry or store processing instructions and data structures and which can be accessed by a general purpose or special purpose computer or other processing device.

Certain operations of controller 22 described herein include operations to interpret and/or to determine one or more parameters. Interpreting or determining, as utilized herein, includes receiving values by any method known in the art, including at least receiving values over communication lines 28, from a datalink, network communication or input device, receiving an electronic signal (e.g. a voltage, frequency, current, or pulse-width-modulation signal) indicative of the value, such as the SOC of a vehicle, receiving a computer generated parameter indicative of the value, reading the value from a memory location on a non-transient machine readable storage medium, receiving the value as a rum-time parameter by any means known in the art, and/or by receiving a value by which the interpreted parameter can be calculated, and/or by referencing a default value that is interpreted to be the parameter value.

The term "logic" as used herein includes software and/or firmware executing on one or more programmable processors, application-specific integrated circuits, field-programmable gate arrays, digital signal processors, hardwired logic, or combinations thereof. Therefore, in accordance with the embodiments, various logic may be implemented in any appropriate fashion and would remain in accordance with the embodiments herein disclosed.

The above-described embodiments of the technology described herein can be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone or any other suitable portable or fixed electronic device.

Also, a computing device may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computing device may receive input information through speech recognition or in other audible format.

Such computing devices may be interconnected by one or more networks in any suitable form, including as a local area network, a controller area network, or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosed embodiments may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed herein. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of the disclosure, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Returning to FIG. 1, each of vehicles 1-5 perform daily missions through a geographic area such as a city. In an example, vehicles 1-5 are busses or other transit vehicles that travel standard routes on fixed schedules. When each vehicle 1-5 completes a mission, it returns to depot 14 and may be charged to ready the vehicle for its next mission.

Figure 2:
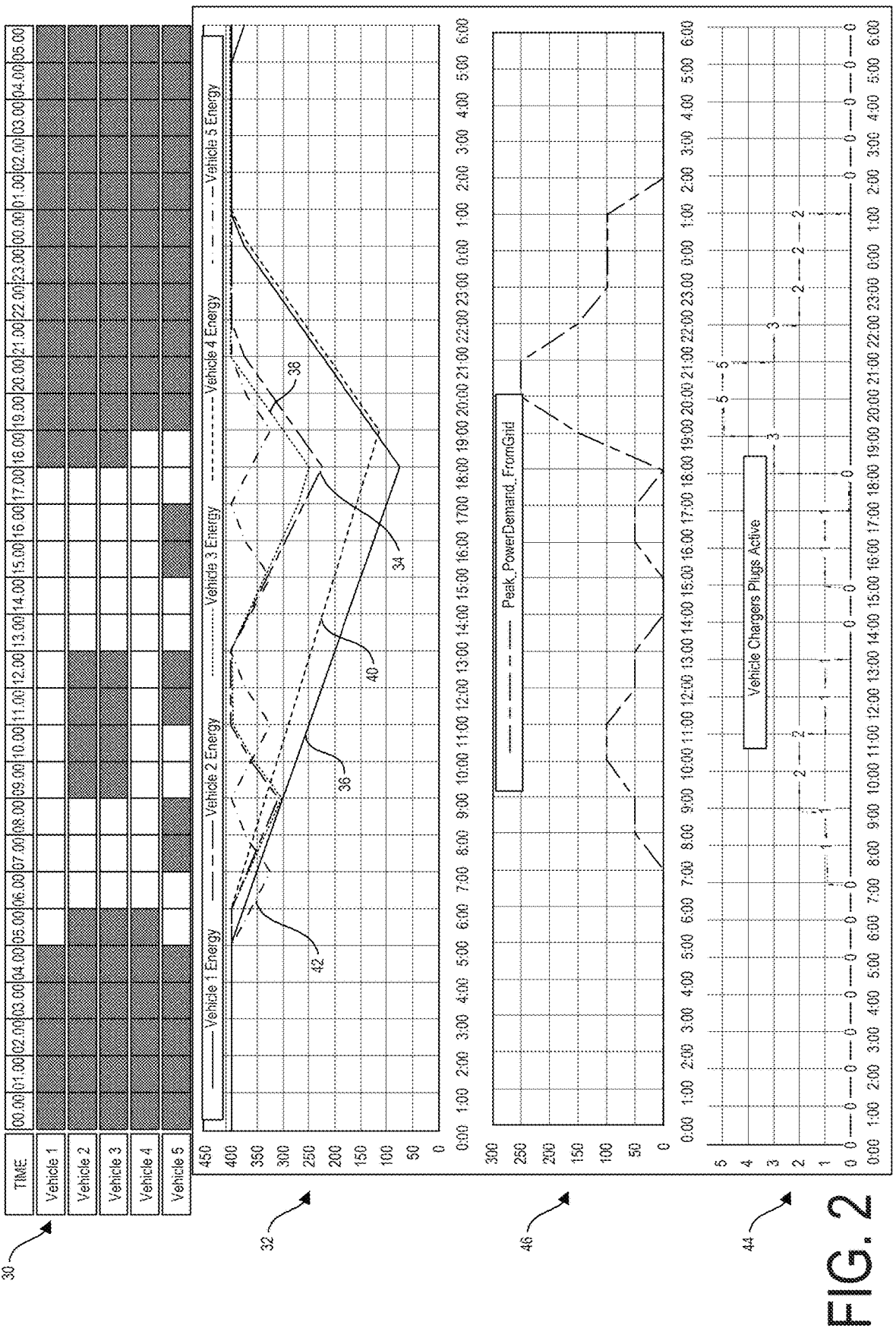
FIG. 2 is a chart showing vehicle mission schedules, active chargers, peak power demand and the state-of-charge ("SOC") of vehicles in a fleet not controlled using the teachings of the present disclosure.

FIG. 2 provides an example schedule 30 for the five vehicles 1-5. In this example, vehicle 1 is on its daily mission from 5:00 am until 6:00 pm and is parked in depot 14 the remainder of the day. Vehicle 2 has two missions, one from 6:00 am until 9:00 am and another from 1:00 pm until 6:00 pm. Vehicle 3 has a schedule that is identical to vehicle 2. Vehicle 4 has a single mission from 6:00 am until 7:00 pm. Finally, vehicle 5 has four, two-hour missions beginning at 5:00 am, 9:00 am, 1:00 pm and 5:00 pm.

The upper chart 32 of FIG. 2 depicts the SOC of each of vehicles 1-5 during a 24-hour period. When fully charged, each vehicle 1-5 has a SOC of 400 kWH, which is its energy capacity in this example. Each of chargers 18A-E has a rated capacity of 50 KW and the electric utility operating grid 26 in this example charges its highest peak demand rates from 10:00 am until 2:00 pm. In the example depicted in FIG. 2, each vehicle is charged while it is parked in depot 14 without regard to its current SOC, the cost of power from grid 26, and without use of SES device 20. In other words, FIG. 2 depicts a charging methodology for fleet 12 that does not use the teachings of the present disclosure to provide peak power optimization. This system or mode of operation will be referred to herein as a "zero intelligence" system or mode.

As shown, the SOC of each vehicle 1-5 decreases when it is on a mission and increases when it is being charged at depot 14. For example, line 34 on chart 32 depicting the SOC of vehicle 2 decreases from 400 kWH at 6:00 am to approximately 300 kWH at 9:00 am, and increases while charging from approximately 300 kWH at 9:00 am to 400 kWH at 11:00 am where it remains, fully charged, until 1:00 pm. During vehicle 2's next mission, its SOC decreases from 400 kWH beginning at 1:00 pm to approximately 225 kWH at 6:00 pm when it returns to depot 14. Then, beginning at 6:00 pm the SOC increases steadily to approximately 375 kWH at 9:00 pm, then to 400 kWH at 10:00 pm where it remains until its next mission beginning at 6:00 am the next day. Similarly, the SOCs of vehicles 1 and 3-5 are represented by lines 36, 38, 40 and 42, respectively, and show the discharging and charging associated with the missions and time in depot 14 of those vehicles.

The lower chart 44 of FIG. 2 shows the number of chargers 18A-E being used to charge vehicles 1-5 over the course of a day. As shown, at 7:00 am one charger is activated to begin charging vehicle 5 when it returns to depot 14. One charger is used until 9:00 am, when vehicle 5 is no longer being charged but two chargers are used to begin charging vehicles 2 and 3. Two chargers remain in use until 11:00 am when vehicles 2 and 3 are fully charged, then one charger is used to begin charging vehicle 5, which returns from its second mission at 11:00 am. One charger remains in use until 1:00 pm, when vehicle 5 is fully charged. No chargers are in use during the next two hours because all of the vehicles 1-5 are on missions. At 3:00 pm one charger is used to charge vehicle 5 after its third mission of the day until 5:00 pm when vehicle 5 is fully charged. No chargers are used for the next hour as all vehicles 1-5 are on missions. Then, at 6:00 pm three chargers are activated to charge vehicles 1-3 when they return to depot 14 for the night. At 7:00 pm, two more chargers are activated to begin charging vehicles 4 and 5 when they return to depot 14 for the night. A total of five chargers are used from 7:00 pm until 9:00 pm when vehicles 3 and 5 reach full charge. Three chargers are used for the next hour until vehicle 2 reaches full charge and the number of active chargers drops to 2. Two chargers are used from 10:00 pm until 1:00 am the next day when vehicles 1 and 4 reach full charge. All chargers are deactivated from 1:00 am the next day until 7:00 am the next day when vehicle 5 returns from its first mission.

The center chart 46 of FIG. 2 shows the overall peak power demand from grid 26 which corresponds to the number of chargers in use as shown in lower chart 44. As shown, the peak demand power reaches 250 KW at 8:00 pm and remains there for one hour. It should be understood from the foregoing that no peak power optimization is used in the example of FIG. 2. For example, during the time between 7:00 pm and 9:00 pm all five chargers are activated simultaneously, leading to a high peak demand and a higher TCO for fleet 12. Additionally, in many locations electric utilities charge more for electricity from grid 26 during certain peak demand hours of the day, such as between 10:00 am and 2:00 pm. Charging vehicles during these hours will result in an increased TCO. No steps are taken in the zero-intelligence system of FIG. 2 to avoid higher peak demand times when electricity is more expensive. Moreover, no SES device 20 is used in this example to offset the use of grid 26 and no chargers are used during the early morning hours when the cost of electricity is often very low. Simply put, the zero-intelligence vehicle charging methodology depicted in FIG. 2 is simply to charge any vehicle entering depot 14 until it is fully charged using grid 26 (not SES device 20), regardless of the number of chargers being used simultaneously and regardless of the time of day.

Systems and methods according to embodiments of the present disclosure provide a vehicle charging approach which takes into account a variety of factors to reduce the TCO of fleet 12 while meeting all of the vehicle fleet mission constraints. As is further described below, the energy status of depot 14 is taken into account, including the status of chargers 18A-E, the status of SES device 20, and the peak energy and energy demand from grid 26. Additionally, the SOC of vehicles 1-5 is monitored and vehicle mission information accounted for including the scheduled departure and return times and the energy required for the next mission. Finally, the cost of energy at various times of the day is taken into account. Controller 22 uses all of this information to provide "intelligence" to the charging methodology which reduces the TCO.

In general, the methodology of the various embodiments of the present disclosure involves control of chargers 18A-E and SES device 20 to reduce the number of chargers 18A-E in use at any given time, to avoid unnecessarily charging vehicles 1-5 during higher peak demand rate periods, to use SES device 20 as needed to power chargers 18A-E instead of or in addition to grid 26, to charge SES device 20 intelligently (i.e., during opportunities when vehicles 1-5 are on missions and/or during lower peak demand times), and to deliver power from SES device 20 back to grid 26 when possible. These various features and functionality characteristics of the present disclosure can be incorporated into systems of different levels of intelligence or used as different modes of the same system as is further described below.

Chart 50 of FIG. 3 summarizes the functionality of systems or modes of operation according to the various levels of intelligence provided by the present disclosure. As shown, a low intelligence system or mode performs peak power optimization (described below), but does not avoid peak demand times (described below), provide power from grid 26 to SES device 20 (described below) or provide power from SES device 20 to grid 26 (described below). A low-medium intelligence system or mode performs peak power optimization and avoids peak demand times, but does not provide power from grid 26 to SES device 20 or from SES device 20 to grid 26. A medium intelligence system or mode performs peak power optimization and avoids peak demand times, and also provides power from grid 26 to SES device 20 (and therefore uses SES device 20 as a power source for chargers 18A-E). The medium intelligence system or mode does not, however, provide power from SES device 20 back to grid 26. A high intelligence system provides all four of the previously mentioned functionality characteristics—peak power optimization, avoid peak demand tunes, provide power from grid 26 to SES device 20 and from SES device 20 back to grid 26. Finally, (as seen in chart 50' of FIG. 15) certain examples of the functionality of systems or modes of operation include any (e.g., all) of the previous four levels of intelligence and an ultra intelligence level of the system or modes of operation provided in the present disclosure. The ultra intelligence system provides for all four functionality characteristics and, optionally, includes vehicle to vehicle charging and multiple terminal optimization (both of which is described below). Any of the five levels of intelligence may be incorporated into charging infrastructure 16 depending on the equipment available in the infrastructure 16 and the needs of the operator of fleet 12.

Peak Power Optimization

The functional characteristic designated peak power optimization is a feature of the system or mode that provides a reduction in the peak power consumed by chargers 18A-E by reducing the number of chargers 18A-E activated at the same time where possible. As is described further below, peak power optimization is carried out by controller 22 based on various input information including the activated/deactivated status of chargers 18A-E at depot 14, the peak energy demand of the chargers 18A-E from grid 26, the SOC and battery size of vehicles 1-5, and the vehicle mission schedules and energy required for the next mission.

Figure 4:
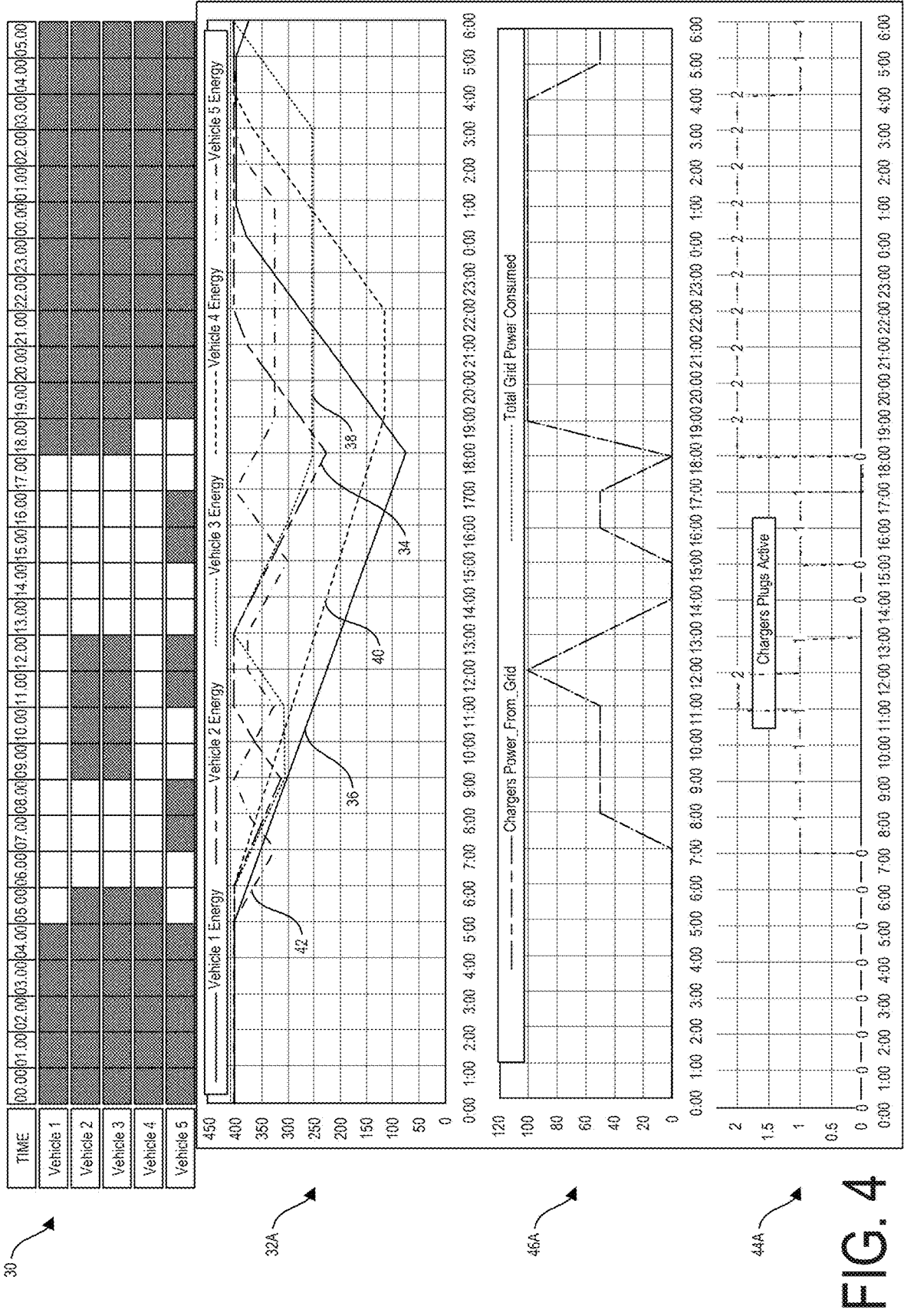
FIG. 4 is a chart similar to FIG. 2 but depicting operation using a low intelligence system or mode according to the present disclosure.

FIG. 4 is similar to FIG. 2 in that it represents the identical vehicle schedules for vehicles 1-5 and includes an upper chart 32A representing the SOC of each of vehicles 1-5, a middle chart 46A representing the overall peak power demand from grid 26, and a lower chart 44A representing the number of chargers 18A-E being used to charge vehicles 1-5 over the course of the day. The difference between charts 32, 44 and 46 of FIG. 2 and charts 32A, 44A and 46A of FIG. 4 is that in FIG. 4 the system is operating with low intelligence as described herein to reduce the number of chargers 18A-E activated at the same time where possible (i.e., the system provides peak power optimization).

As shown, at 7:00 am one charger is activated to charge vehicle 5 when it returns from its first mission of the day. The charger remains activated until 9:00 am when vehicle 5 reaches full charge. Until this point, the charging activation of the systems of the two figures is identical. At 9:00 am in FIG. 4, however, instead of activating two chargers to charge vehicles 2 and 3 simultaneously when the charger for vehicle 5 is deactivated as is done in the zero intelligence system of FIG. 2, the low intelligence system of FIG. 4 only activates one charger to charge vehicle 2, allowing the SOC of vehicle 3 to remain at approximately 300 kWH for the next two hours. Controller 22 knows that vehicle 3 will not be needed until 1:00 pm and only two hours (the time between 11:00 am when vehicle 2 becomes fully charged and its charger is deactivated and 1:00 pm) will be needed to charge vehicle 3 from 300 kWH to full charge of 400 kWH. In this manner the low intelligence system of FIG. 4 operates only one charger from 7:00 am until 11:00 am, when a second charger is activated to begin charging vehicle 5 when it returns from its second mission of the day.

The second charger in FIG. 4 is only activated for one hour because controller 22 knows that vehicle 5 will be capable of completing its next two-hour mission without being fully charged. The charger for vehicle 3 remains activated between 12:00 pm and 1:00 pm to fully charge vehicle 3 because that level of charge will be required for vehicle 3 to complete its next five-hour mission beginning at 1:00 pm. The number of chargers activated between the hours of 1:00 pm and 6:00 pm are the same for both systems. In the low intelligence system of FIG. 4, at 6:00 pm only two chargers are activated (instead of three in zero intelligence system of FIG. 2). Chargers for vehicles 1 and 2 are activated in FIG. 4, but not for vehicle 3. Instead, vehicle 3 remains at a SOC of approximately 250 kWH until 3:00 am because controller 22 knows vehicle 3 can be charged to fill charge between 3:00 am and 6:00 am when its next mission begins.

Unlike the zero intelligence system of FIG. 2 which activates a total of five chargers between 7:00 pm and 9:00 pm, the low intelligence system of FIG. 4 activates only two chargers because none of vehicle 3 (described above), vehicle 4, or vehicle 5 are charged during these hours. Controller 22 knows that charging can begin for vehicle 4 at 10:00 pm when vehicle 2 reaches full charge and its charger is deactivated. Similarly, controller 22 knows that charging can begin for vehicle 5 at 1:00 am when vehicle 1 reaches full charge and its charger is deactivated.

In the example depicted in FIG. 4, the fact that only two chargers are used during the hours of 6:00 pm to 10:00 pm reduces the peak power demand of the system significantly down to approximately 100 KW as shown in center chart 46A instead of the maximum of 250 KW as depicted in center chart 46 of FIG. 2. Additionally, the charger downtimes are reduced over the course of the day. Specifically, over the twenty-four-hour period of 6:00 am to 6:00 am in FIG. 4 all chargers are deactivated simultaneously for only four hours, whereas in FIG. 2 all chargers are deactivated simultaneously for nine hours. The flattening of the power demand of chargers 18A-E using peak power optimization results in a lower TCO for fleet 12.

Figure 5:
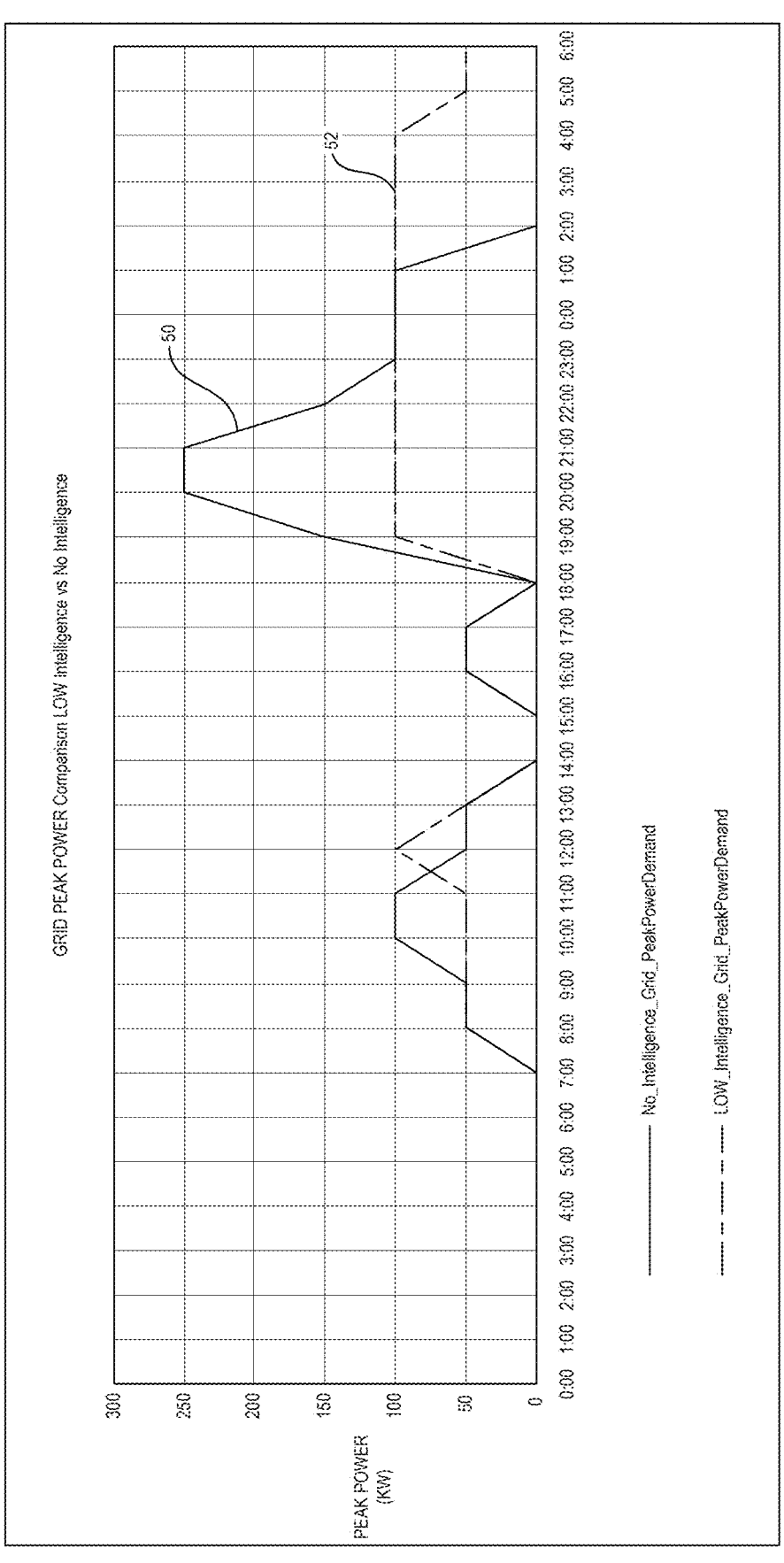
FIG. 5 is a graph showing the peak power demand difference between the system corresponding to FIG. 2 (e.g., a zero intelligence system) and the low intelligence system corresponding to FIG. 4.

FIG. 5 shows the peak power demand of the zero intelligence system of FIG. 2 (line 50) and the peak power demand of the low intelligence system of FIG. 4 (line 52). The reduction of peak power demand and the reduction in charger downtimes are reflected in the flattening of the peak power demand represented by line 52.

Avoid Peak Demand

The functional characteristic designated avoid peak demand times is a feature of the system or mode of operation that reduces the TCO for fleet 12 by avoiding use of chargers

18A-E during hours of the day when prices charged for power from grid 26 are highest (i.e., peak demand times). The avoid peak demand times feature may be implemented in addition to the peak power demand feature described above to provide a system of low-medium intelligence.

Figure 6:
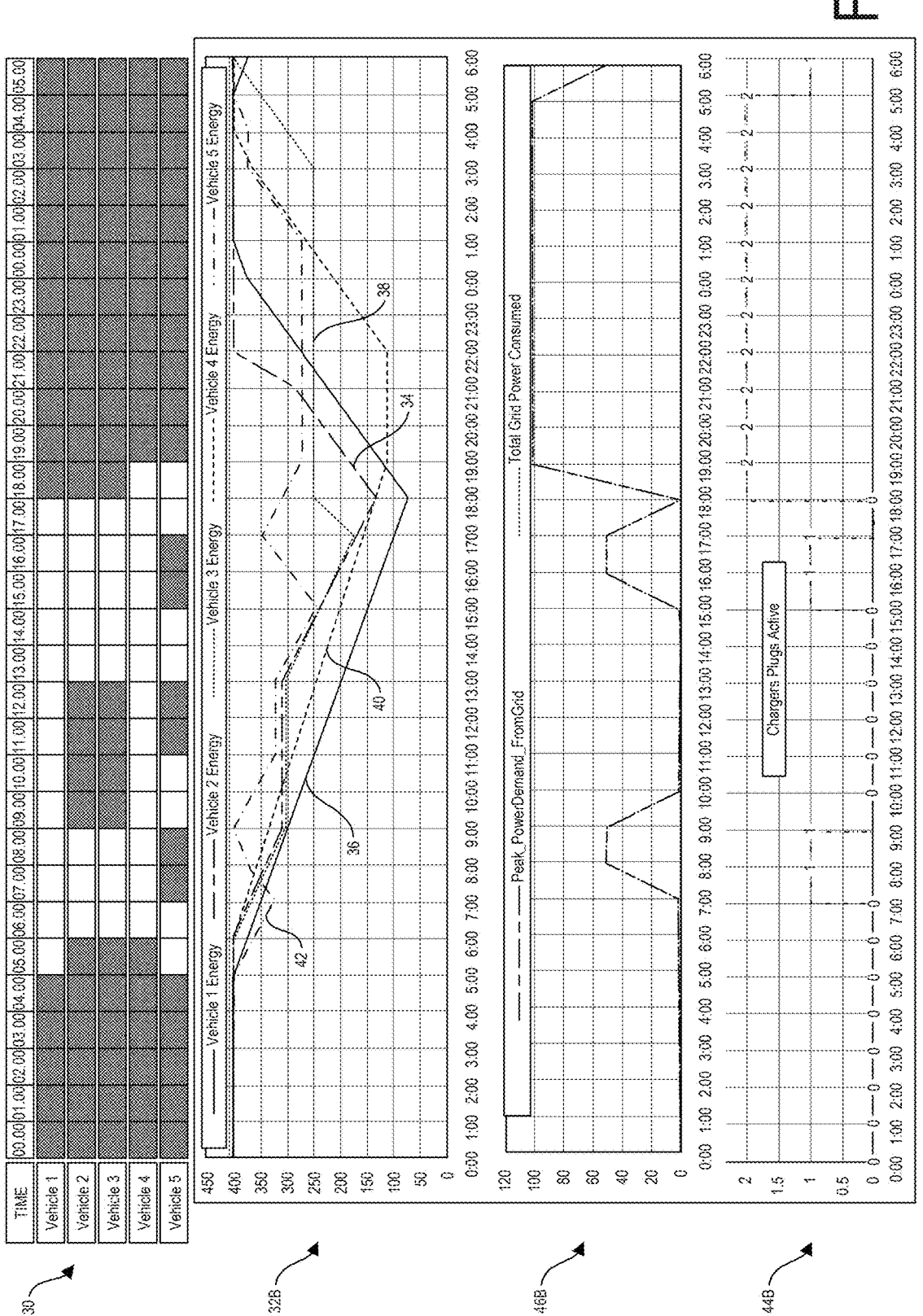
FIG. 6 is a chart similar to FIG. 2 but depicting operation using a low-medium intelligence system or mode according to the present disclosure.

FIG. 6 is similar to FIG. 4 and FIG. 2 in that it represents the identical vehicle schedules for vehicles 1-5 and includes an upper chart 32B representing the SOC of each of vehicles 1-5, a middle chart 46B representing the overall peak power demand from grid 26, and a lower chart 44B representing the number of chargers 18A-E being used to charge vehicles 1-5 over the course of the day. The difference between charts 32A, 44A and 46A of FIG. 4 and charts 32B, 44B and 46B of FIG. 6 is that in FIG. 6 the system is operating with low-medium intelligence as described herein to reduce the number of chargers 18A-E activated at the same time where possible (i.e., the system provides peak power optimization) and to avoid the use of chargers 18A-E during peak demand times (i.e., the system also provides avoid peak demand times). In this example, it is assumed that peak demand times begin at 10:00 am and continue until 3:00 pm.

Referring to lower chart 44B, at 7:00 am one charger is activated to charge vehicle 5 when it returns from its first mission of the day. The charger remains activated until 9:00 am when vehicle 5 reaches full charge. To this point, the charging provided by the low intelligence system of FIG. 4 and the low-medium intelligence system of FIG. 6 is the same. At 9:00 am, however, instead of continuing to activate one charger to charge vehicle 2 after its first mission as in FIG. 4, the low-medium intelligence system of FIG. 6 deactivates all chargers knowing that the approximately 300 kWH SOC of vehicle 2 will be sufficient to carry out its second mission of the day beginning at 1:00 pm and ending at 6:00 pm. As shown in upper chart 32B, after that second mission, the SOC of vehicle 2 decreases to approximately 150 kWH.

In the low-medium intelligence system of FIG. 6, zero chargers IgA-E are activated between 9:00 am and 3:00 pm (lower chart 44B). Consequently, unlike the low intelligence system of FIG. 4, charging does not begin at 11:00 am for vehicles 3 and 5. Instead, vehicle 3 is permitted to remain at the reduced SOC of approximately 300 kWH (like vehicle 2) because controller 22 knows that level of charge will be sufficient for vehicle 3 to complete its five hour mission beginning at 1:00 pm. Similarly, vehicle 5 is permitted to remain at a reduced SOC of approximately 320 kHW because controller 22 knows that level of charge will be sufficient for vehicle 5 to complete its third mission of the day beginning at 1:00 pm.

The use of chargers 18A-E is the same for the low intelligence system of FIG. 4 and the low-medium intelligence system of FIG. 6 from 3:00 pm until 4:00 am. At 4:00 am, however, the low-medium intelligence system of FIG. 6 continues to operate two chargers for an additional hour to fully charge vehicle 5. In the manner described above, the low-medium intelligence system avoids peak demand times and thereby reduces the TCO of operating fleet 12 relative to the low intelligence system and the zero intelligence system described above. As shown middle chart 46B, the peak power demand of the low-medium intelligence system is lower than that of the low intelligence system of FIG. 4 (middle chart 46A) between 9:00 am and 2:00 pm and still never exceeds 100 KW.

Figure 7A:
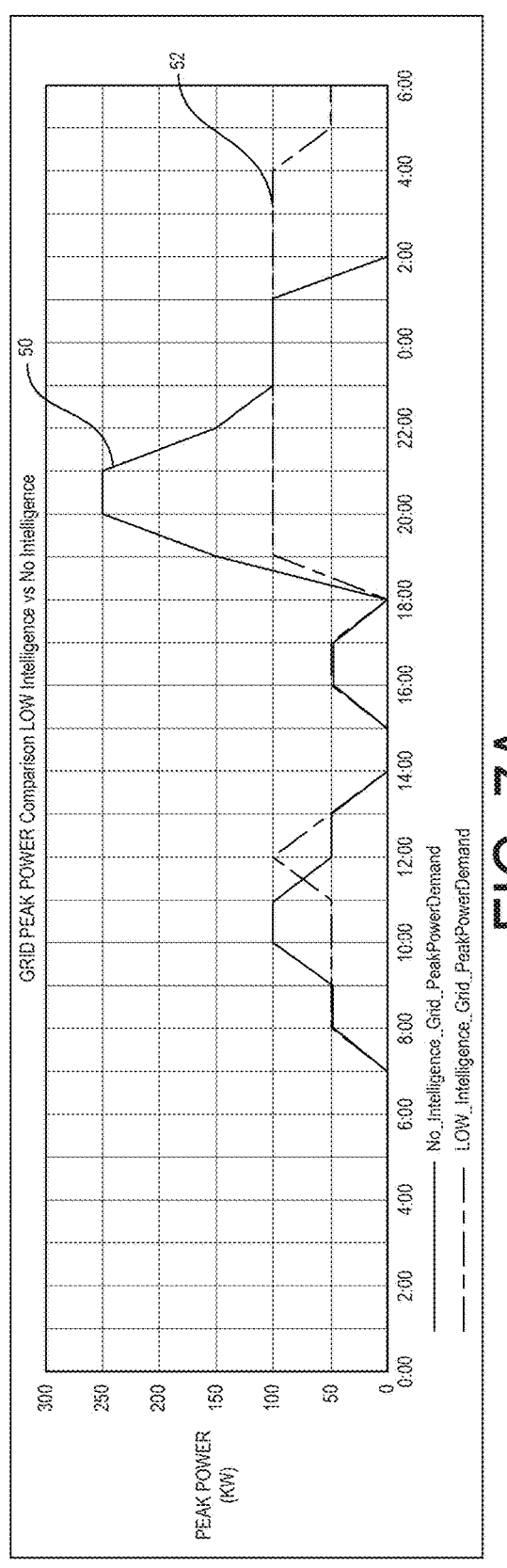
FIG. 7A, like FIG. 5, is a graph showing the peak power demand difference between a zero intelligence system and a low intelligence system.
Figure 7B:
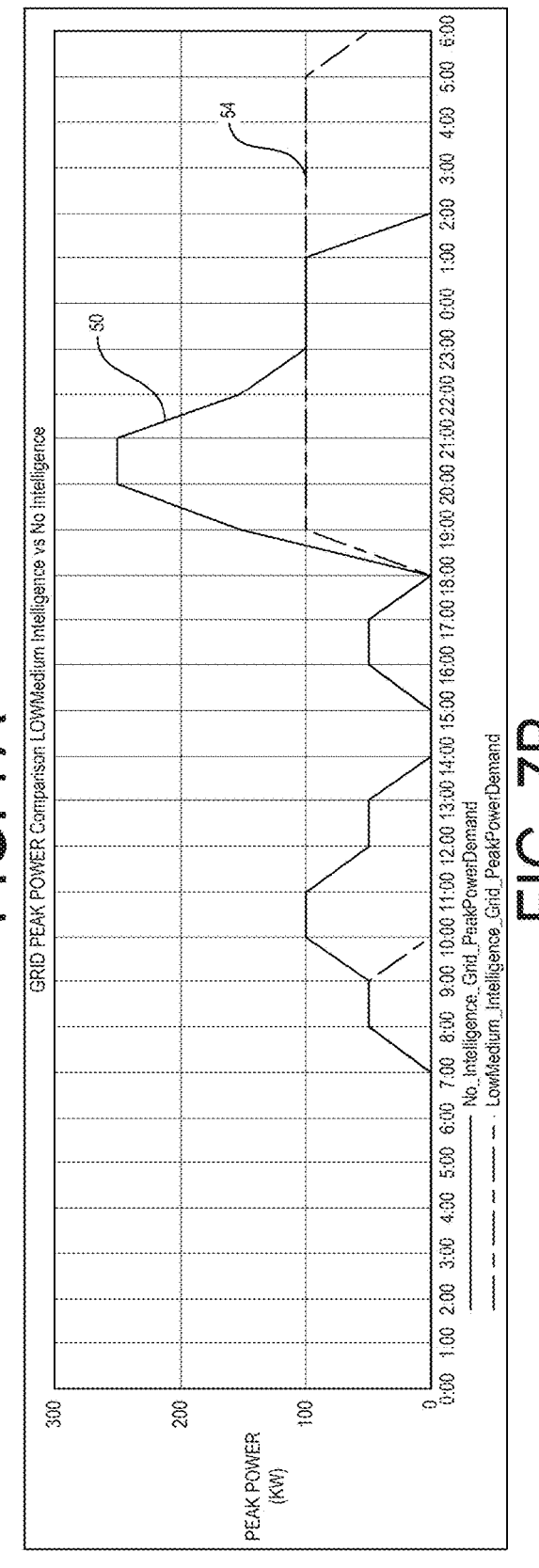
FIG. 7B is a graph showing the peak power demand difference between a zero intelligence system and a low-medium intelligence system.

FIG. 7A is the same as FIG. 5 and shows the peak power demand of the zero intelligence system of FIG. 2 (line 50) and the peak power demand of the low intelligence system of FIG. 4 (line 52). The reduction of peak power and the reduction in charger downtimes are reflected in the flattening of the peak power demand represented by line 52. FIG. 7B shows the peak power demand of the zero intelligence system of FIG. 2 (line 50) and the peak power demand of the low-medium intelligence system of FIG. 6 (line 54). As shown, the peak demand times are avoided and the peak power demand remains low.

Grid to SES Device

The functional characteristic designated grid 26 to SES device 20 is a feature of the system or mode of operation that takes advantage of SES device 20 for providing power to chargers 18A-E. The grid 26 to SES device 20 feature may be implemented in addition to the peak power demand feature and the avoid peak demand times feature described above to provide a system of medium intelligence.

Figure 8:
FIG. 8 is a chart similar to FIG. 2 but depicting operation using a medium intelligence system or mode according to the present disclosure.

FIG. 8 is similar to FIGS. 2, 4 and 6 in that it represents the identical vehicle schedules for vehicles 1-5 and includes an upper chart 32C representing the SOC of each of vehicles 1-5, a middle chart 46C representing the overall peak power demand from grid 26, and a lower chart 44C representing the number of chargers 18A-E being used to charge vehicles 1-5 over the course of the day. FIG. 8 also includes a second middle chart 56 which depicts the use of SES device 20 to power chargers 18A-E as is further described below. Also, middle chart 46C not only shows the overall peak power demand from grid 26 (line 58), but also power provided from grid 26 to chargers 18A-E (line 60) and power provided from grid 26 to SES device 20 (line 62). Additionally, lower chart 44C not only shows the number of chargers 18A-E being used to charge vehicles 1-5, but also when SES device 20 is being charged (line 64). Finally, upper chart 32C shows the SOC of SES device 20 (line 66) in addition to the SOC of vehicles 1-5. In this example, SES device 20 has a 500 KW capacity.

As shown in the lower chart 44C of FIG. 8, SES device 20 is charged by grid 26 beginning at 1:00 pm and ending at 6:00 pm, and again beginning at 3:00 am and ending at some point later the next day. It should be understood that it all of the vehicle missions and the electricity charge rates are identical from day to day, then the SEC device 20 charging will repeat from day to day. Consequently, as shown by line 66 of upper chart 32C, SES device 20 is fully charged when vehicle 5 returns to depot 14 from its first mission at 7:00 am. As shown in middle chart 56 and lower chart 44C, SES device 20 is used to power one charger from 7:00 am until 9:00 am, two chargers from 9:00 am until 11:00 am, and one charger from 11:00 am until 1:00 pm. During this time, no power is obtained from grid 26, yet the same charging is provided as with the zero intelligence system of FIG. 2 (see lower chart 44 from 7:00 am until 1:00 pm).

Beginning at 1:00 pm, power is obtained from grid 26 to charge SES device 20 as shown by line 64 in lower chart 44C and line 62 in middle chart 46C. No chargers 18A-E are activated from 1:00 pm until 3:00 pm because all of vehicles 1-5 are on missions. At 3:00 pm one charger is activated (to charge vehicle 5 upon return from its third mission) and powered by grid 26 (while SES device 20 is charging) as shown in lower chart 44C and line 60 in middle chart 46C. While one charger is activated and SES device 20 is being charged, the total power consumed from grid 26 increases to 100 KW as shown by line 58 in in middle chart 46C. At 5:00 pm the single charger is deactivated as vehicle 5 reaches full charge of 400 kWH (line 42 of upper chart 32C). This is shown in lower chart 44C and reflected by lines 58 and 60 of middle chart 46C.

At 6:00 pm, when vehicles 1-3 return to depot 14, three chargers are activated as shown in lower chart 44C and charging of SES device 20 stops (line 64). It should be recognized from the foregoing that SES device 20 was charged from 1:00 pm until 6:00 pm when all of the vehicles 1-5 were on missions (except from 3:00 pm until 5:00 pm for vehicle 5). Beginning at 6:00 pm, SES device 20 is used to power one of the activated chargers as depicted in middle chart 56. At 9:00 pm, when vehicle 3 reaches full charge, SES device 20 is deactivated (middle chart 56) and one charger is deactivated, leaving two chargers activated to charge vehicles 1 and 2. Two chargers remain activated until 3:00 am to fully charge vehicles 1 and 5. At 3:00 am, the number of activated chargers is reduced to one to charge vehicle 4 until it is fully charged at 4:00 am, when the number of activated chargers is reduced to zero. Also at 3:00 am, SES device 20 begins charging from grid 26 as shown by line 64 of lower chart 44C.

As should be apparent from the foregoing, in this example of a medium intelligence system, SEC device 20 is used to power chargers to charge vehicles during the peak demand times. Additionally, SEC device 20 provides power for one of the three chargers during the maximum peak power demand times of the system, maintaining a low maximum peak power demand of approximately 100 KW. As indicated above, in this medium intelligence system, SEC device 20 is charged using grid 26 while vehicles 1-5 are on missions, again maintaining a low peak power.

SES Device to Grid

Figure 9:
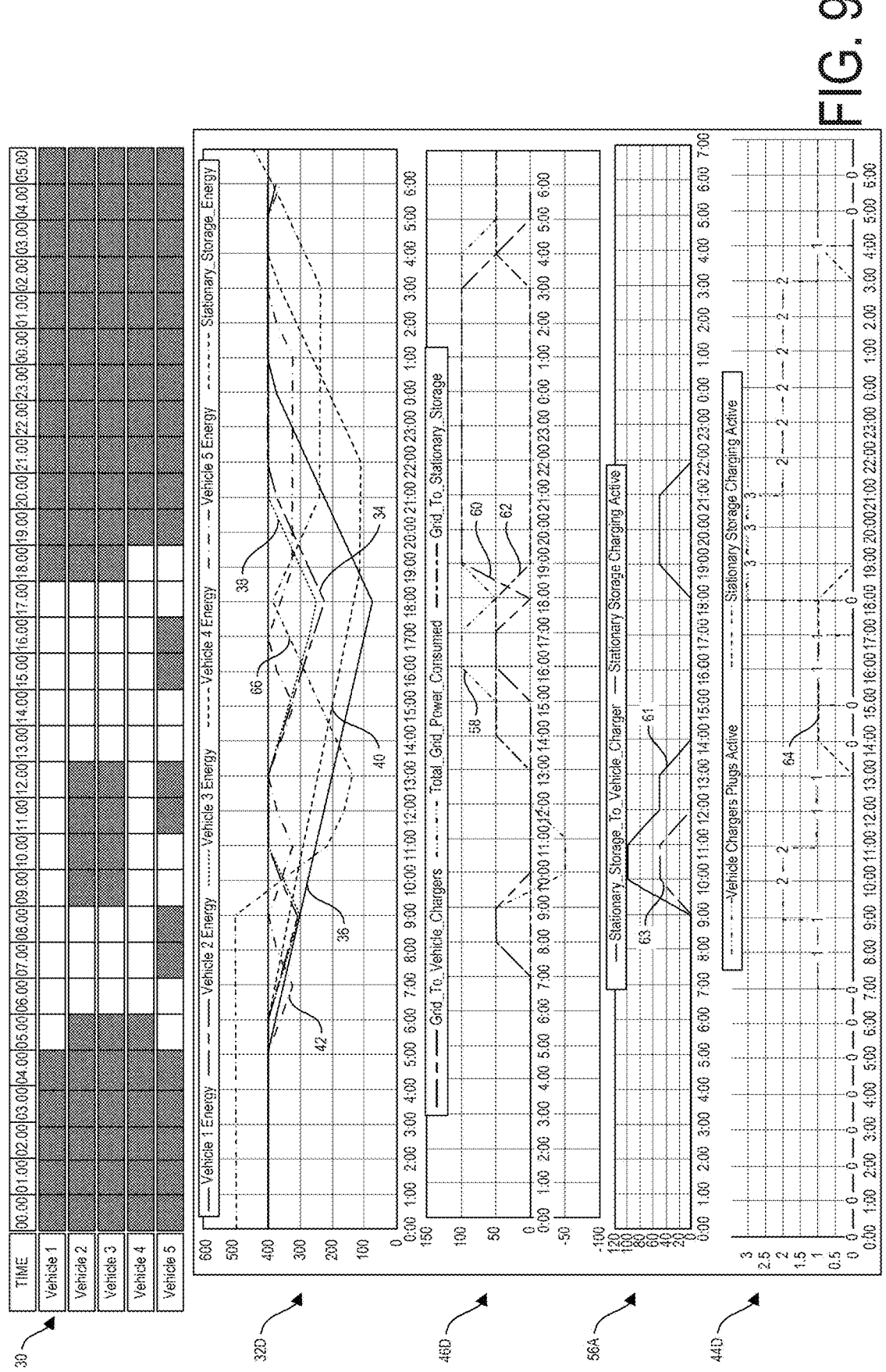
FIG. 9 is a chart similar to FIG. 2 but depicting operation using a high intelligence system or mode according to the present disclosure.

Referring now to FIG. 9, the performance characteristics of a bi-directional system of high intelligence is shown. A bi-directional high intelligence system as described herein includes each of the functional characteristics described above, as well as the characteristic of providing electricity from SES device 20 back to grid 26 when possible, and preferably when the price of electricity is high. It should be understood that in other embodiment, electricity may be provided from vehicles 1-5 back to grid 26 instead of or in addition to SES device 20. The charts 32D, 46D, 56A, and 44D of FIG. 9 are identical to the corresponding charts of FIG. 8 except during the hours between 7:00 am and 12:00 pm. Starting at 7:00 am, the high intelligence system of FIG. 9 uses power from grid 26 to power the single charger that is activated (see chart 56A) instead of power from SES device 20 (see chart 56). In this manner, electricity from SES device 20 can be conserved to be later provided back to grid 26 and provide a credit or negative power consumption event. As shown in chart 46D, power from grid 26 is used (line 60) to charge vehicle 5 and the total grid power consumed (line 58) increases to approximately 50 KW.

At 9:00 am, SES device 20 begins to provide power to activate the two chargers being used (line 61 of chart 56A) just as was the case in the medium intelligence system represented in chart 56 of FIG. 8. However, between the hours of 9:00 am and 11:00 am, SES device 20 is also caused by controller 22 to deliver electricity back to grid 26 (line 63 of chart 56A). As SES device 20 was not used between 7:00 am and 9:00 am, its full charge of 500 kWH was retained (line 66 of chart 32D), and even though some of that saved charge is delivered back to grid 26 during the next two hours, SES device 20 retains sufficient charge to continue providing power to chargers until its next charge from grid 26 at 1:00 pm. The delivery of charge by SES device 20 back to grid 26 is shown in chart 46D of FIG. 9 as a negative total grid power consumption from 9:00 am until 11:00 am.

Thus, as should be apparent from the foregoing, the high intelligence system of FIG. 9 incorporates all of the functional characteristics discussed herein and may approach a maximum reduction in TCO for fleet 12 which, as discussed below, is achievable using an ultra intelligence system.

Figure 10:
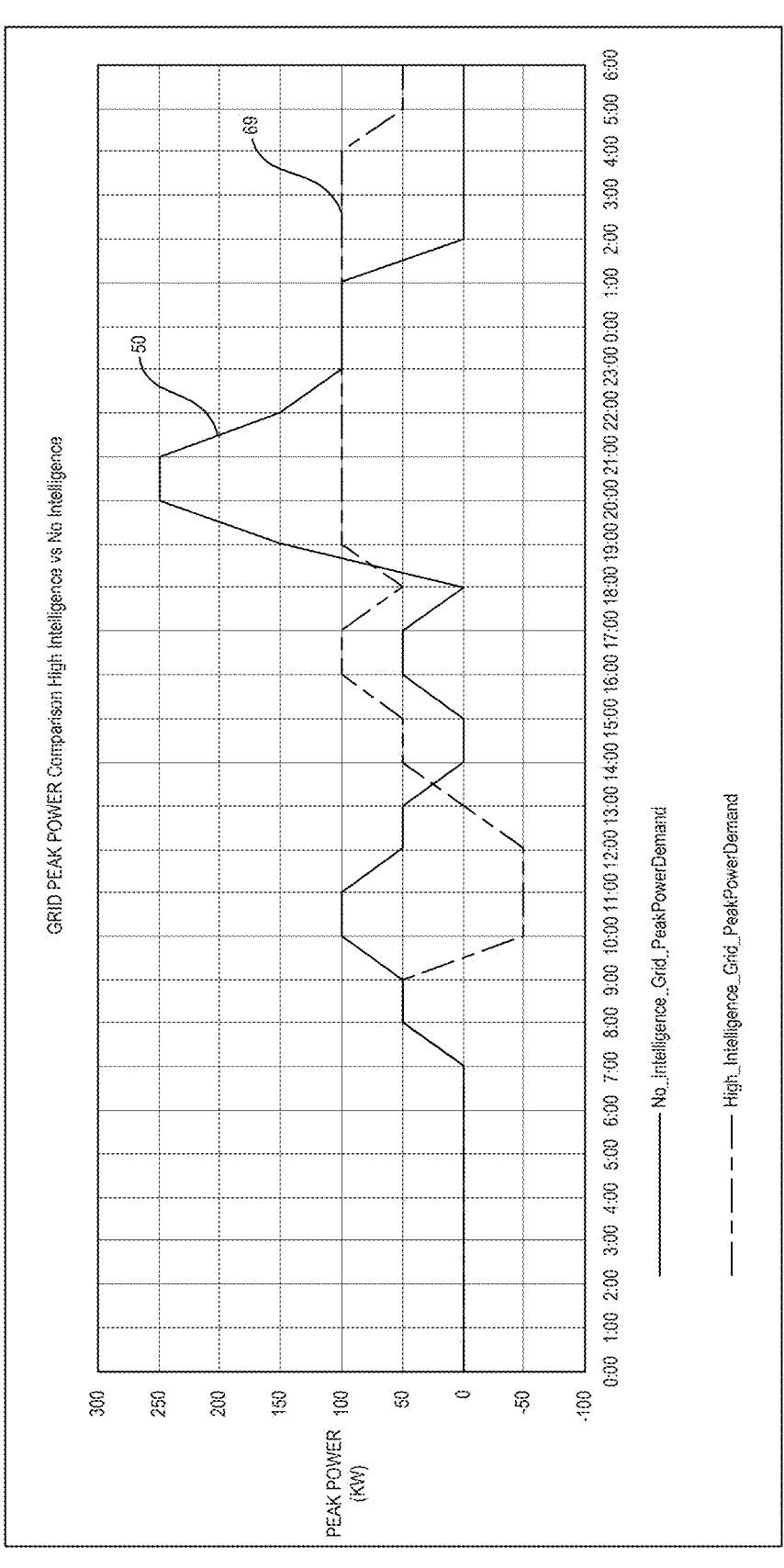
FIG. 10 is a graph showing the peak power demand difference between a zero intelligence system and a high intelligence system.

FIG. 10 shows the peak power demand of the zero intelligence system of FIG. 2 (line 50) and the peak power demand of the high intelligence system of FIG. 9 (line 69). As shown, the peak demand times are avoided (in fact, energy is delivered back to grid 26 during these times) and the peak power demand remains low.

Vehicle to Vehicle Charging and Multiple Charging Depots Optimization

An improvement over the high intelligence system can be achieved via vehicle to vehicle charging and multiple charging depots optimization. The functional characteristic designated vehicle to vehicle charging is a feature of the system or mode of operation that leverages a vehicle's ability for providing power to another vehicle. Further, the functional characteristic designated multiple charging depots optimization is a feature of the system or mode of operation that leverages sending vehicles to different charging depots connected to different parts of grid having different peak times to only charge at a charging depot when that that section of the grid is not at a peak time. Either or both of the vehicle to vehicle charging and multiple charging depots optimization features may be implemented in addition to the grid to SES device feature, the peak power demand feature, and the avoid peak demand times features described above to provide a system of ultra intelligence.

Chart 50' of FIG. 15, similar to FIG. 3, summarizes the functionality of systems or modes of operation according to the various levels of intelligence provided by the present disclosure. FIG. 15 differs from FIG. 3 by adding an ultra intelligence system or mode that performs peak power optimization, avoid peak demand times, provide power from the grid to SES device, provide power from the SES device back to grid, vehicle to vehicle charging, and multiple charging depots optimization. Any of the five levels of intelligence may be incorporated into the charging infrastructure depending on the equipment available in the infrastructure and the needs of the operator of the fleet. The ultra intelligence system or mode is often described as having both vehicle to vehicle charging and multiple charging depots optimization. However, it is understood that the ultra intelligence system or mode can have either or both of the described characteristics.

Similar to the high intelligence system, the ultra intelligence system is used to reduce TCO for the fleet. In addition to using the SES device to charge vehicles during peak power times and selling energy back to the grid from the SES device, the ultra intelligence system uses the vehicles' ability to charge each other instead of or in addition to using power from the grid during peak power times. During non-peak hours, the controller using the ultra intelligence system charges vehicles to a higher SOS than what is needed for its mission. Then, during peak hours, the controller can allow vehicles needing charge to charge using vehicle to vehicle charging, taking the excess charge from the vehicles that were charged to a high SOS than needed for their missions. Vehicle to vehicle charging further reduces the TCO for the fleet. The system discussed herein is perhaps best understood in the context of a specific, practical non-limiting example of a scenario where vehicle to vehicle charging is used to optimize TCO. For example, to begin, vehicle 1 is back at the charging depot charging during a non-peak hour for its last mission that only requires 100 kWH of energy. The controller using the ultra intelligence system notifies the operator of vehicle 1, potentially by a user interface, that there is an opportunity to charge vehicle 1 beyond the 100 kWH needed to its energy capacity of 400 kWH. Vehicle 1 is then charged beyond the needed 100 kWH and continues to carry out the mission. Later in the day, vehicles 1, 2, 3, and 4 are back at depot 14 during the depot's peak demand hours. Vehicle 1 does not have any more missions for the rest of the day, but has 300 kWH of energy left. Vehicles 2, 3, and 4 all need charged before their next mission. SES device 20 is charging vehicles 2 and 3, but does not have enough energy to charge vehicle 2, 3 and 4. The controller receives this information and, using the ultra intelligence system, commands vehicle 1 to use its excess charge received earlier to charge vehicle 4. Both the operators of vehicle 1 and vehicle 4 are notified of the vehicle vehicle charging and instructed where to park so the vehicles are in close proximity to each other to achieve the vehicle to vehicle charging. Then, at a non-peak time, vehicle 1 can recharge to prepare for the next day's missions.

Vehicle to vehicle charging can also be utilized when unpredictable events take place, resulting in a vehicle needing more charge than previously predicted. For example, when outside forces, such as a traffic jam or road closure, cause a vehicle to use more energy than previously calculated, the vehicle can sends a signal out to the controller indicating charge is needed. The controller receives the information and determines if the affected vehicle is within a certain proximity to another vehicle with excess charge or another charging depot. The proximity of another vehicle able to give excess charge is based on many factors. Factors can include, but are not limited to, geographical distance from the affected vehicle, amount of excess charge, geographical distance from a charging depot, mission schedule, and ability to get to the affected vehicle. If the affected vehicle is close to a vehicle with excess charge, the controller will dispatch the vehicle with excess charge to the affected vehicle. The controller can conununicate to both the affected vehicle operator and the operator of the vehicle with excess charge through a user interface, or other means of notification, where the vehicle to vehicle charging will take place. If vehicle to vehicle charging is not available, the controller will determine which charging depot to send the vehicle to in order to receive charge.

In addition to the vehicle to vehicle charging, the ultra intelligence system can use multiple charging depots to reduce TCO. Different depots can have different peak hours, e.g., depending on where on the grid the depot is located since different areas of grid 26 experience different peak power demands. As is described further below, multiple charging depots optimization is carried out by the controller based on a plurality of characteristics of the charging depots. Using the ultra intelligence system, the controller can be configured to send vehicles and use the SES device at different depots depending at each charging depot's peak hours. For example, if the controller determines a first depot experiences peak hours from 10:00 am to 2:00 pm and a second depot experiences peak hours between 4:00 pm to 8:00 pm and a vehicle needs a charge from the grid at 12:00 pm, the controller performing the ultra intelligence system will send the vehicle needing a charge from the grid to the second depot because the second depot is experiencing non-peak demand at 12:00 pm. In addition, or in alternative, if later in the day at 6:00 pm a vehicle needs a charge from the grid, controller 22 will send that vehicle to the first depot to charge. In this regard, the ultra intelligence system uses multiple depots at different points of the day. Additionally, the ultra intelligence system may provide electricity back to the grid at different charging depots throughout the day. Inversely to charging of vehicles at different depots, when a first depot is experiencing peak demand hours, the controller will allow the SES device to provide energy back to the grid at the first depot. Then, when the second depot is experiencing peak demand hours, the controller instructs the SES device to provide electricity back to the second depot to maximize payout from providing electricity back to the grid.

Thus, as should be apparent from the foregoing, the ultra intelligence system incorporates all of the functional characteristics discussed herein and may result in the maximum reduction of TCO for fleet 12.

Figure 11:
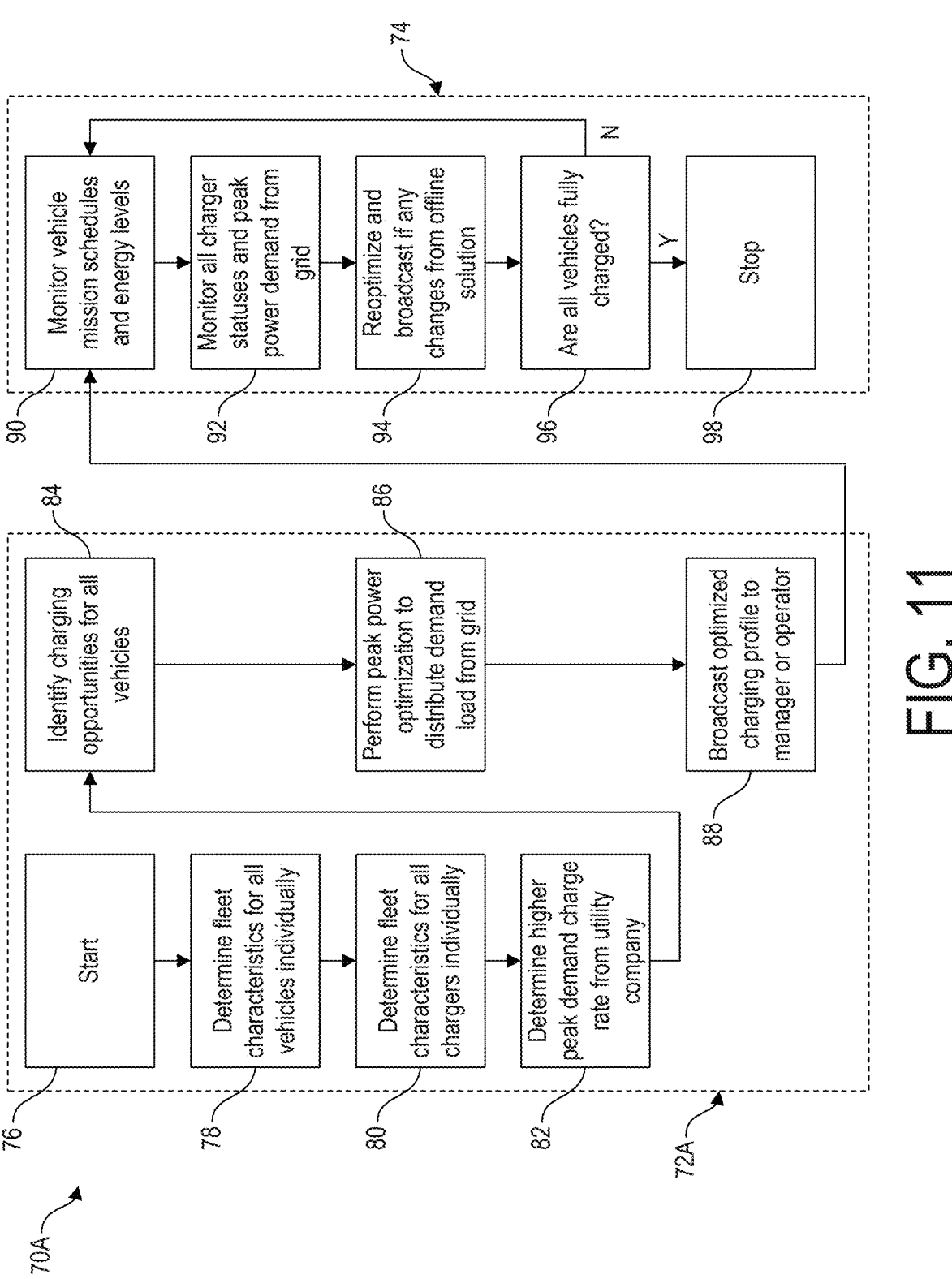
FIG. 11 is a flow chart depicting a method of charging vehicles using a low intelligence system according to the present disclosure.
Figure 16:
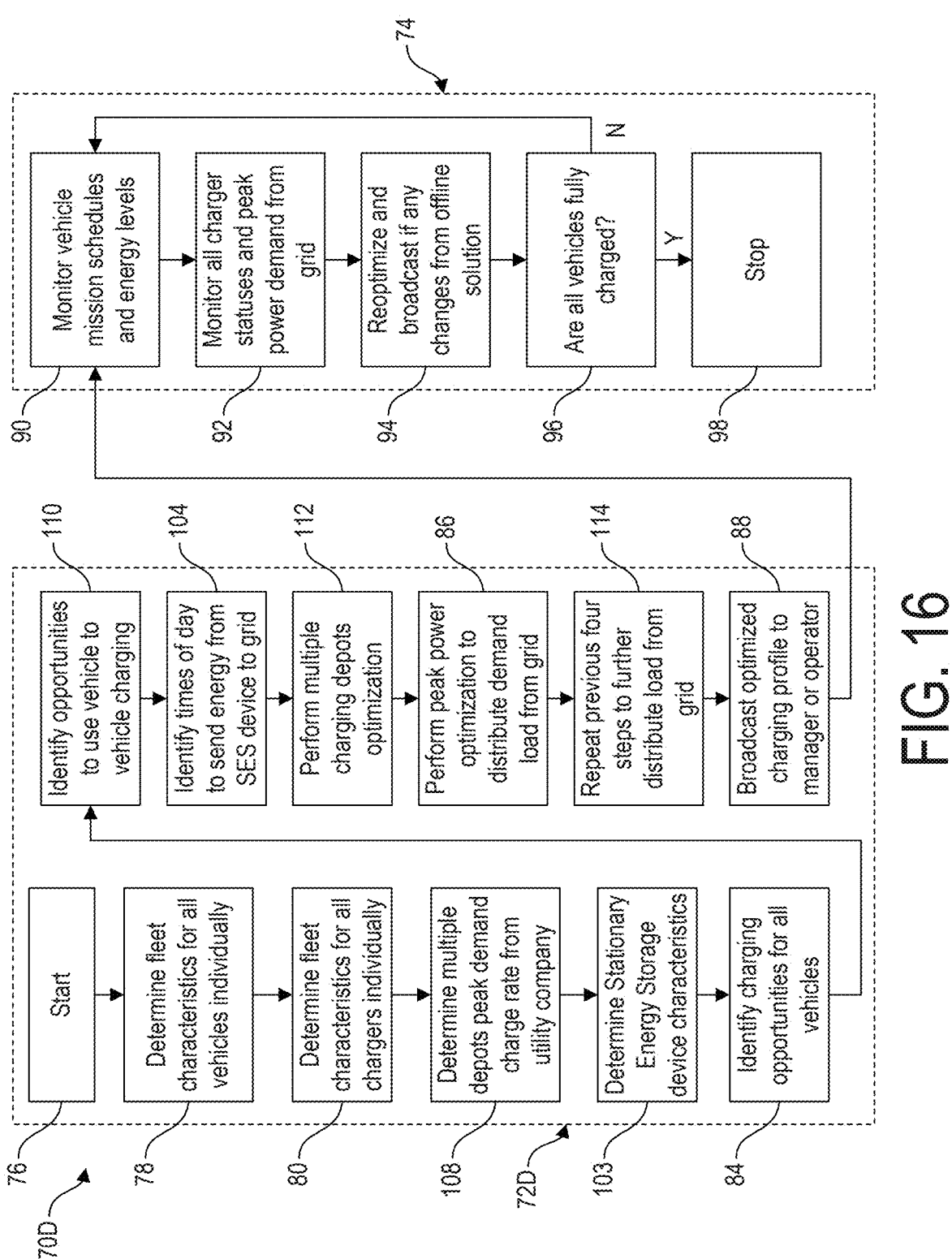
FIG. 16 is a flow chart depicting a method of charging vehicles using an ultra intelligence system according to the present disclosure.

Referring now to FIGS. 11-14 and 16, high level process flow charts are shown for low intelligence system operation (FIG. 11), low-medium intelligence system operation (FIG. 12), medium intelligence system operation (FIG. 13), high intelligence system operation (FIG. 14), and ultra intelligence system operation (FIG. 16). Referring first to FIG. 11, low-intelligence mode of operation 70A generally includes an offline calculation 72A including a series of steps and an online calculation 74 including a series of steps. Online calculation 72A begins at step 76 which may occur at a fixed time each day or some other fixed or variable interval. Once online calculation 72A is initiated, controller 22 determines, at step 78, a variety of characteristics of each vehicle 1-5 in fleet 12. More specifically, controller 22 receives inputs regarding the size of the batteries in each vehicle 1-5 (i.e., the charge capacity of the vehicle), the schedule of mission times for each vehicle, and the expected energy levels required for each mission. Controller 22 may receive this information from an operator who manually enters the data, from a controller on each vehicle 1-5, or from some other source. The expected energy levels for each mission may be directly provided to controller 22 or derived by controller 22 from route information for each mission. The expected energy level may take into account the distance to be traveled during the mission, the scheduled stops over the route of the mission, the elevation changes to be encountered over the route of the mission, the weight of the vehicle and its payload at various points of the route, the equipment to be operated by the vehicle such as an HVAC system, the traffic lights and signs controlling traffic over the route and/or the estimated traffic to be encountered, which affects idle time and vehicle stops, the speed limits over the route, and other information.

Next, at step 80, controller 22 determines various characteristics of chargers 18A-E. Specifically, controller 22 determines the type and size of each charger 18A-E of infrastructure 16. The type of charger may be a base charger, a sequential charger, or a parallel charger. The size of the charger is a measure of its charging capacity in terms of KW. A sequential charger may have the capability to connect to up to four vehicles simultaneously, but can only charge one vehicle with its maximum power at any instant in time. A parallel charger may have the capability to charge up to three vehicles at a time. The charging power of a parallel charger may depend upon the number of plugs that are active (i.e., the number of vehicles being charged). The type and size of charger information may be inputted manually into controller 22 by an operator periodically or communicated directly to controller 22 by chargers 18A-E.

At step 82, controller 22 determines the peak demand charge rates for the utility company operating grid 26. The low Intelligence system handles peak power optimization, but not peak charge time avoidance. While the system does not avoid the peak demand times, it is configured to minimize the peak power which will impact the peak demand charges that the customer will experience. This does not factor in the time of day charges (uses a single value instead), but rather considers the peak power during the day which is minimized. Controller 22 may receive the rate information from the utility directly over a network such as the internet or from another source. Alternatively, the information may be inputted into controller 22 manually.

Next, at step 84, controller 22 processes the vehicle characteristics, the charger characteristics and the rate information to identify charging opportunities for each of vehicle 1-5. This may include running simulations for each vehicle through its mission day. The energy consumed for each vehicle is determined. Regardless of the intelligence level of the system, each of the charging patterns are explored based on the simulations. The data that emerges from this essentially provides the description of the charging opportunities at stop 84. This will be then augmented in step 86 described below though a simple monte carlo or variation study that varies the charge amounts in a virtual simulation to identify a constraint based solution space (the constraint is that the vehicles need to be appropriately recharged and be ready for the next mission on time). It should be understood, however, that the space of solutions may not be limited to just one option. In this manner, the minimization of the peak power comes into play at step 86. Thus, in essence by assessing the amount of energy needed by each vehicle, knowing the vehicle schedules and the constraints they face (e.g., time available for recharge), a variation study provides the viable space of solutions, from which the optimum solution is selected. All of this is done virtually.

After the opportunities for charging are identified in step 84, controller 22 performs peak power optimization to distribute the power demand load from grid 26 at step 86. In other words, controller 22 determines based upon the identified charging opportunities, how to activate a minimum number of chargers 18A-E simultaneously and how to minimize the charger downtimes to provide a reduced TCO. At step 88, an optimized vehicle charging profile for the day (or another period) is broadcast from controller 22 to a fleet manager or operator to follow. Alternatively, or in addition, controller 22 may automatically initiate the optimized vehicle charging profile.

The offline calculation 72A described above provides a starting optimized profile for infrastructure 16. Online calculation 74 then executes until all vehicles 1-5 are charged and in the process, may modify the initial profile in the manner described below. Specifically, at step 90 controller 22 monitors the mission schedules and current energy levels or SOC for vehicles 1-5. The mission schedules may be inputted into controller 22 in the manner described above. The SOC of each vehicle 1-5 may be monitored by controller 22 through chargers 18A-E when a vehicle 1-5 is connected to one of the chargers. Alternatively, vehicles 1-5 may communicate their SOC to controller 22 directly through wireless communications or over communication lines 28.

At step 92, controller 22 monitors the status of each charger 18A-E to see if the charger is in use and to determine the amount of power the charger is drawing from grid 26. This information may be obtained by controller 22 over communication lines 28. Controller 22 also determines the peak power demand from grid 26 at any given time of the day. Depending upon the extent to which the information (i.e., vehicle missions, vehicle SOCs, charger power draw and peak power demand from grid 26) collected in steps 90 and 92 deviates from the information used in the offline calculation 72A, controller 22 may at step 94 reoptimize a charging profile for depot 14 and rebroadcast the reoptimized profile in the manner described above. The magnitude of this deviation may be determined using real world data applicable to a particular customer. For example, some regions may see more variation than others simply because of the large unknowns that the vehicles may face (e.g., bigger cities tend to embody those variations more than less urbanized areas). Thus, the system architecture (i.e., the number of chargers and charger power, the battery size, etc.) may be tailored to support the variation of each region, and consistent deviation acts as the trigger (e.g., a 5-10% deviation). Optionally, the deviation may be variable based on the region.

At step 96 controller 22 determines whether all vehicles 1-5 in depot 14 are fully charged by receiving the SOC of each vehicle 1-5 and determining if the SOC is the same as the maximum charge value stored for the vehicle. If all vehicles are not fully charged, the controller 22 repeats steps 90, 92 and 94 until all vehicles are fully charged. When all vehicles are fully charged, the online calculation 74 terminates at step 98.

Figure 12:
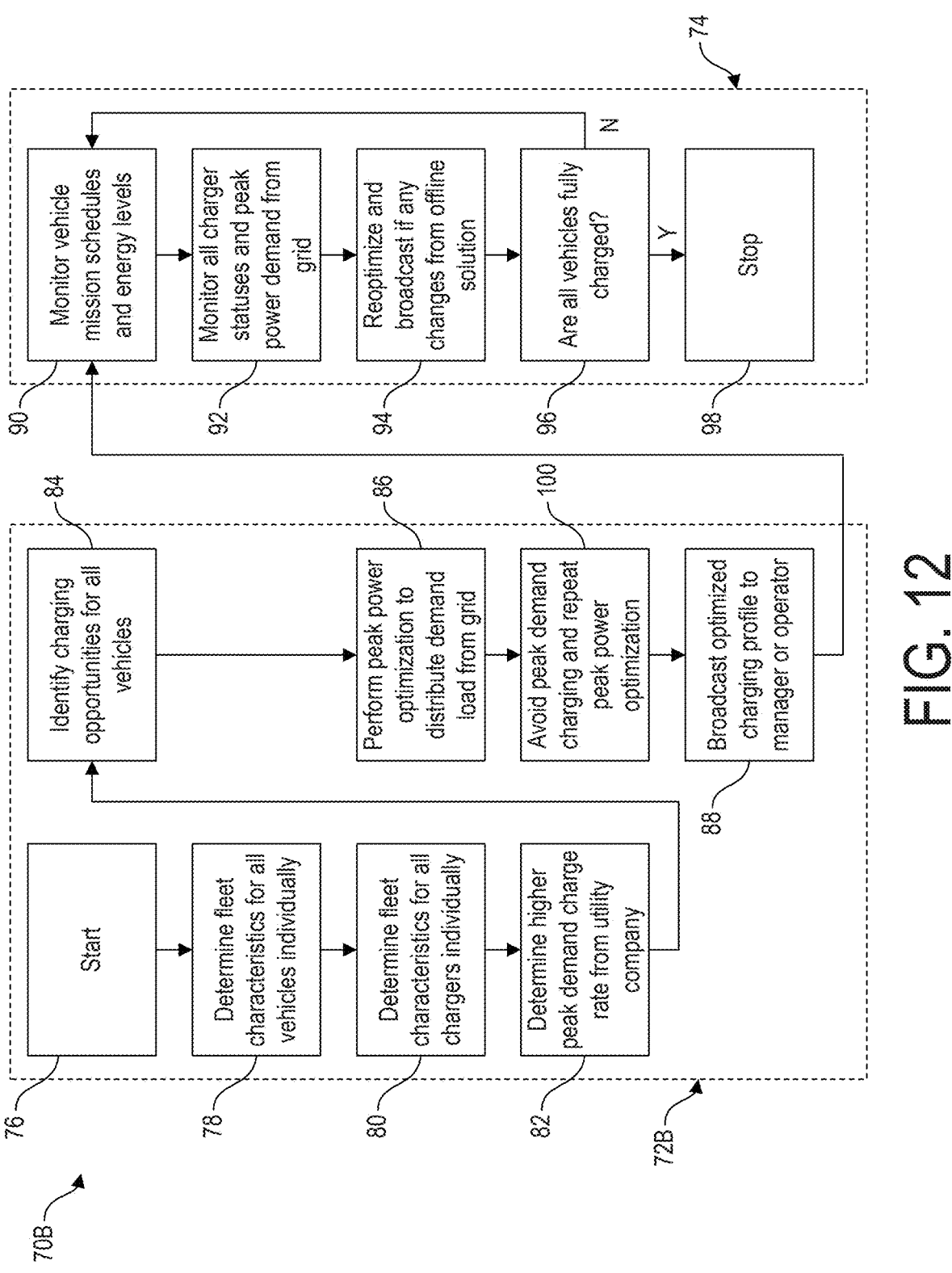
FIG. 12 is a flow chart depicting a method of charging vehicles using a low-medium intelligence system according to the present disclosure.

Referring now to FIG. 12, in the depicted low-medium mode of operation 70B the online calculation 74 is the same as the online calculation 74 for the low intelligence system described above. The offline calculation 72B for the low-medium system is also the same except for the addition of step 100. In step 100, the low-medium system performs the additional operation of avoiding charging vehicles during peak demand times (when electricity cost is high) and repeats the peak power optimization operation described above with reference to step 86. Using the principles described above, the algorithm would now also include the demand charge profile. In certain embodiments, the simplest way to avoid peak demand charges is to find the lowest TCO, while including this time-based demand charge profile to the process described above. Finding the minimum TCO will automatically cause the process to avoid peak demand times (if possible).

Figure 13:
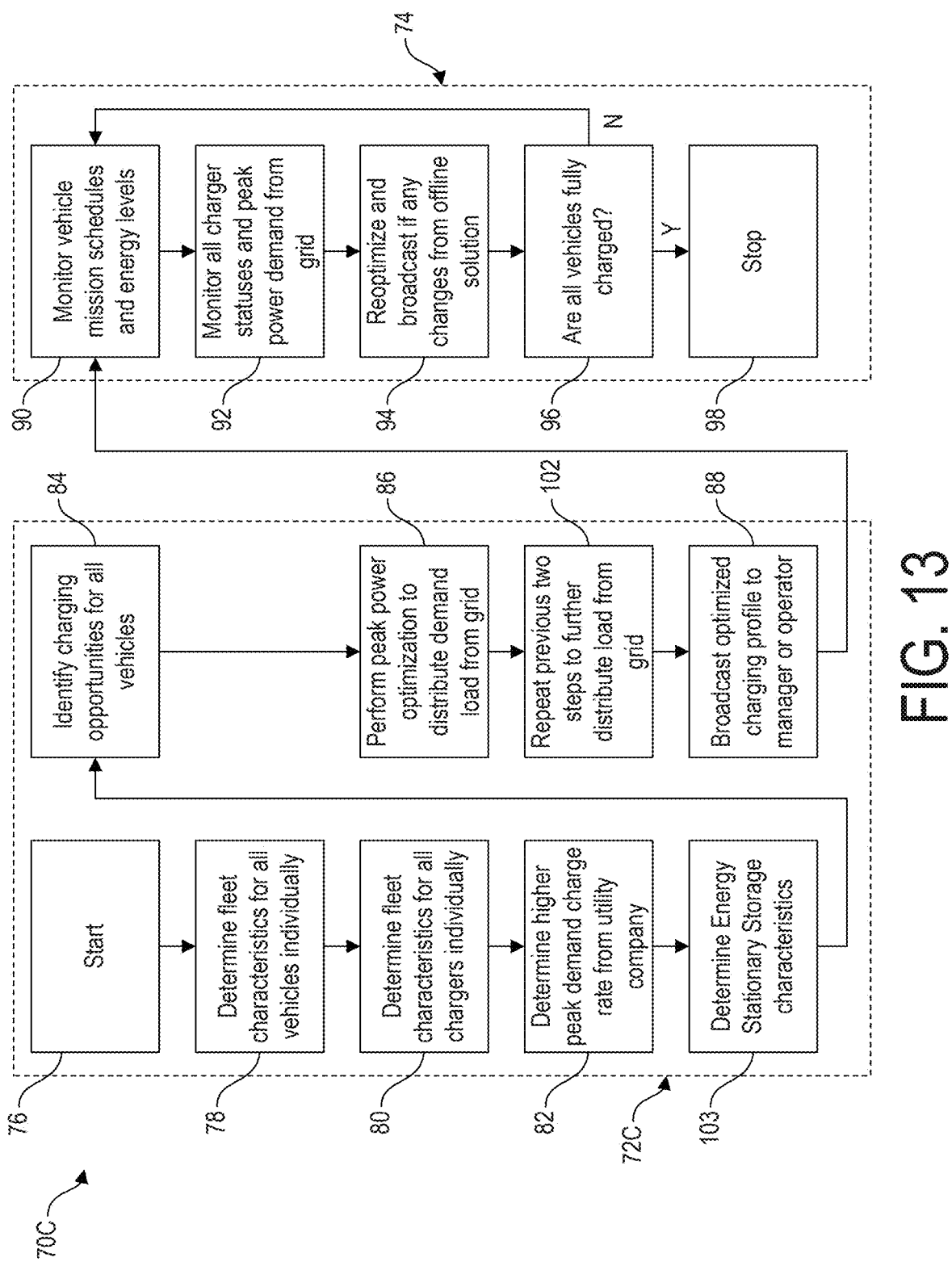
FIG. 13 is a flow chart depicting a method of charging vehicles using a medium intelligence system according to the present disclosure.

FIG. 13 depicts the medium intelligence mode of operation 70C. Process 70C is the same as process 70B of FIG. 12 except as described below. In process 70C, and specifically during the offline calculation 72C, controller 22 determines at step 103 the characteristics of SES device 20 after determining the characteristics of the vehicles and the chargers and determining the higher peak demand charge rates in steps 78, 80 and 82, respectively. The characteristics of SES device 20 may include the charging capacity of SES device 20 (kW), and the type of SES device 20. After step 103, controller 22 identifies charging opportunities for all vehicles 1-5 at step 84 and performs peak power optimization at step 86. During step 86, controller 22 takes into account the use of SES device 20 to power chargers to avoid use of electricity from grid 26 (i.e., during peak demand times and/or when the use of chargers simultaneously would result in an unacceptably high peak power demand). Then, at step 102, controller 22 repeats steps 84 and 86 to further distribute the load from grid 26. The remainder of the offline calculation 72C and the online calculation 74 are the same as those described above.

Figure 14:
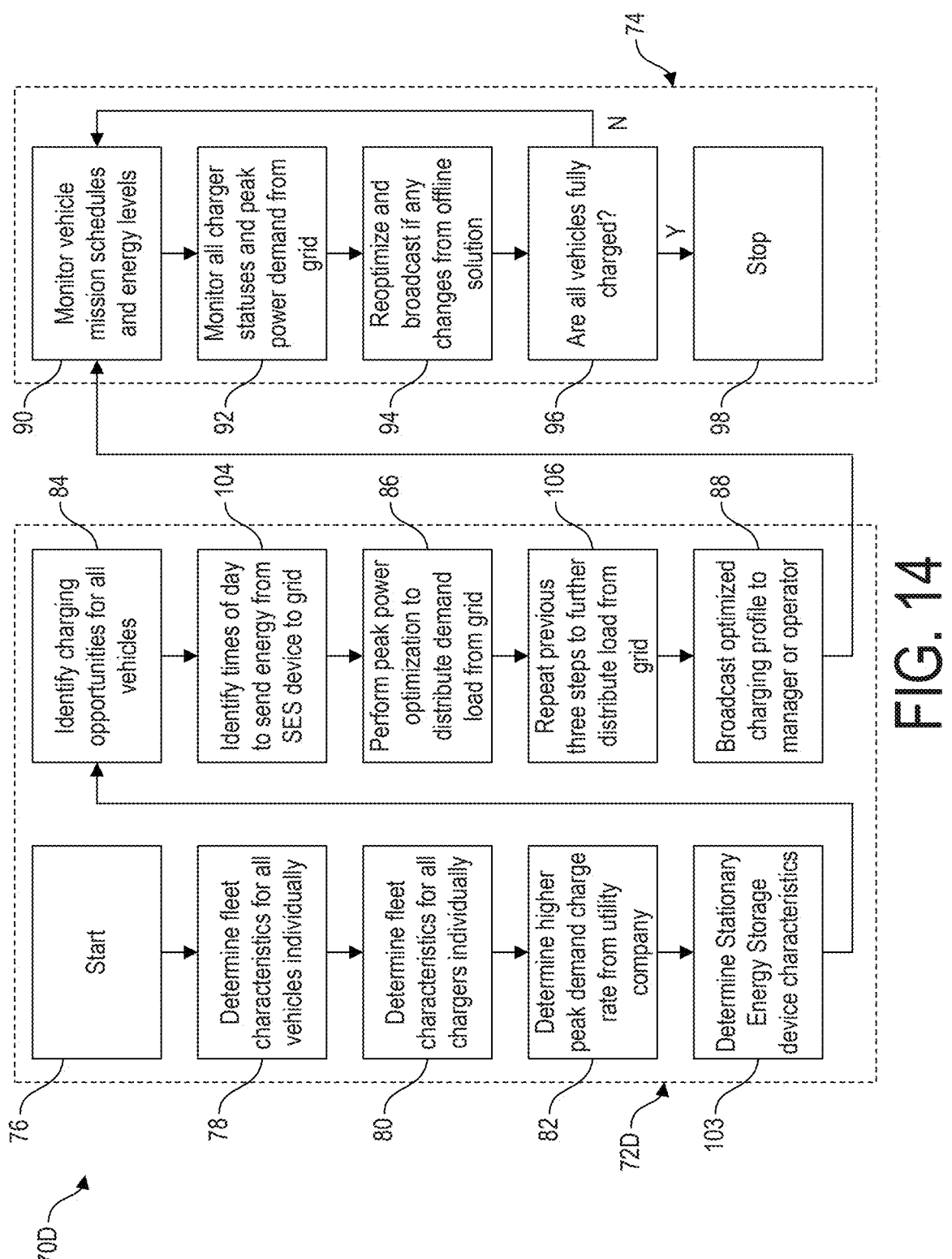
FIG. 14 is a flow chart depicting a method of charging vehicles using a high intelligence system according to the present disclosure.

Referring now to FIG. 14, the process 70D for a high intelligence mode of operation is shown. Steps 76, 78, 80 and 82 of offline calculation 72D are the same as the correspondingly numbered steps in offline calculation 72A described above with reference to FIG. 11. Step 103 of offline calculation 72D is the same as step 103 of offline calculation 72C described above with reference to FIG. 13. After determining the characteristics of SES device 20 at step 103, controller 22 identifies charging opportunities at step 84 as described above. Then, at step 104, controller 22 identifies times of the day to send energy from SES device 20 back to grid 26. As indicated above, depending upon the vehicle charging requirements of the system, the electric power stored in SES device 20 may not be needed to power chargers 18A-E during a particular day. If that is the case, then energy stored in SES device 20 may be returned to grid 26 in exchange for credit or a refund from the utility company. At step 104, controller 22 determines if it is possible to return energy from SES device 20 during times of the day when the refund will be highest because the price of electricity is high.

Step 86 is the same as that described above with reference to FIGS. 11-13. After step 86, controller 22 repeats steps 84, 104 and 86 to further distribute the load from grid 26. The remainder of process 70D is the same as processes 70A-C described above.

FIG. 16 depicts the ultra intelligence mode of operation 70E. Process 70E is the same as process 70D of FIG. 14 except as described below. Steps 76, 78 and 80 of offline calculation 72E are the same as the correspondingly numbered steps in offline calculation 72A described above with reference to FIG. 11. However, step 108 of offline calculation 72E replaces step 82 of offline process 72A. Step 108 of process 72E determines the peak demand charges rates of multiple charging depots. This determination informs the ultra intelligence system of peak demand charges of multiple charging depots and when they occur.

Steps 103 and 84 of offline calculation 72E are the same as steps 103 and 84 of offline calculation 72D described above with reference to FIG. 14. After identifying charging opportunities for all vehicles, controller 22 identifies opportunities to use vehicle to vehicle charging in step 110. As discussed above, during peak demand hours, vehicles with excess charge can charge vehicles needing charged. To achieve this step, during non-peak demand hours, vehicles are charged to a SOS higher than what is needed for their missions. Then, during peak demand hours, vehicles with excess charge are able to transfer that excess charge to other vehicles that need charging.

Step 104 of offline calculation 72E is similar to offline calculation 72D. However, step 104 of offline calculation 72E takes into account multiple charging depots when determining if it is possible to return energy from SES device 20 during times of the day when the refund will be highest due to peak energy demand. This allows the ultra intelligence system to use the information from step 108 in calculating where and when to sell back energy from SES device 20 in step 104. The ultra intelligence system maximizes the refund by selling energy back to the system at each charging depot as each charging depot reaches its individual peak demand charge rate, which is determined in step 108.

After step 104 of offline calculation 72E, ultra intelligence system performs a multiple charging depot optimization step 112. Controller 22 determines, based upon the determined multiple depot peak demand charge rate 108 and identified charging opportunities for all vehicles 84, which charging depot to send vehicles to. This optimization of step 112 uses the information of when charging depots reach their peak demand to avoid those depots at their peak demand hours for charging vehicles.

Step 86 is the same as that described above with reference to FIGS. 11-14. After step 86, controller 22 repeats steps 84, 110, 104, 112, and 86 to further distribute the load from grid 26 in step 114. Finally, in step 88, an optimized vehicle charging profile for the day is broadcast from controller 22 to a fleet manager or operator to follow, as described above with reference to FIGS. 11-14.

While various embodiments of the disclosure have been shown and described, it is understood that these embodiments are not limited thereto. The embodiments may be changed, modified and further applied by those skilled in the art. Therefore, these embodiments are not limited to the detail shown and described previously, but also include all such changes and modifications.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

24

What is claimed is:

1. An electrified vehicle with a powertrain, the powertrain comprising:
   a battery; and
   a controller configured to be in communication with a plurality of electric vehicles, the controller including a processor and a non-transient computer readable storage medium comprising instructions that, when executed by the processor, cause the vehicle to:
      determine a plurality of characteristics of the electrified vehicle, the plurality of characteristics including a charge capacity of the battery, a mission schedule for the electrified vehicle, and an ability to participate in vehicle to vehicle charging for the electrified vehicle;
      determine a plurality of characteristics of a plurality of chargers at a plurality of charging depots coupled to an electric power grid, the plurality of characteristics including a type of each charger and a charging capacity of each charger;
      determine a plurality of characteristics of each of the plurality of charging depots, the plurality of characteristics including when each charging depot reaches peak demand hours;
      process the plurality of characteristics of the electrified vehicle, the plurality of characteristics of each of the plurality of chargers, and the plurality of characteristics of multiple charging depots to identify charging opportunities for the electrified vehicle over the course of a time period, the charging opportunities including vehicle to vehicle charging between the electrified vehicle and at least one other electrified vehicle;
      perform a multiple charging depot optimization analysis to generate a power grid peak hour profile, the power grid peak hour profile being configured to minimize charging the electrified vehicle at any of the plurality of charging depots experiencing peak hour demand; and
      perform a peak power optimization analysis to generate a vehicle charging profile, the vehicle charging profile being configured to avoid activating chargers at charging depots experiencing peak demand hours and utilize vehicle to vehicle charging during peak demand hours.

2. The electrified vehicle of claim 1, wherein the controller determines an opportunity for the electrified vehicle to receive an excess charge at the charging depot, the excess charge being more charge than the battery of the electrified vehicle needs to perform the missions of the vehicle.

3. The electrified vehicle of claim 2, wherein when the controller determines an opportunity for vehicle to vehicle charging, the controller communicates to the electrified vehicle operator commencement instructions on how to commence the vehicle to vehicle charging.

4. The electrified vehicle of claim 3, wherein the instructions to commence vehicle to vehicle charging include:
   a determination of any excess charge the electrified vehicle may receive during charging at a charging depot;
   a location to meet one of a plurality of other electrified vehicles; and
   a determination of which vehicle is being charged and which vehicle is taking charge during the vehicle to vehicle charging.

5. The electrified vehicle of claim 1, wherein the controller sends out a signal to at least one of a plurality of other electrified vehicles when the electrified vehicle experiences an unexpected event.

6. The electrified vehicle of claim 4, wherein the unexpected event is any event that occurs during the electrified vehicle's mission schedule that requires more charge than the controller previously determined, such as sitting in traffic or road closure.

7. The electrified vehicle of claim 5, wherein the signal is a notification to at least one of the plurality of other electrified vehicles to initiate vehicle to vehicle charging to charge the electrified vehicle experiencing the unexpected event.

8. The electrified vehicle of claim 1, wherein an optimized charging profile is created by combining the vehicle charging profile with the power grid peak hour profile.

9. The electrified vehicle of claim 8, wherein the controller communicates to an operator of the electric vehicle a schedule that conforms to the optimized charging profile, the optimized charging profile including:

when to charge the electrified vehicle at one of the plurality of charging depots;

which charger to charge the electrified vehicle on at the charging depot;

how much charge to receive at the charging depots; and when to take part in vehicle to vehicle charging.

10. A method for charging a plurality of electric vehicles, comprising:

determining a plurality of characteristics of each vehicle in a plurality of vehicles, the plurality of characteristics including a charge capacity of a battery system of each vehicle, a mission schedule for each vehicle, and an ability to participate in vehicle to vehicle charging for each vehicle;

determining a plurality of characteristics of each charger in a plurality of chargers at a plurality of charging depots coupled to an electric power grid, the plurality of characteristics including a type of each charger and a charging capacity of each charger;

determining a plurality of characteristics of each of the plurality of charging depots, the plurality of characteristics including when each charging depot reaches peak demand hours;

processing the plurality of characteristics of each of the plurality of vehicles, the plurality of characteristics of each of the plurality of chargers, and the plurality of characteristics of multiple charging depots to identify charging opportunities for each of the plurality of vehicles over the course of a time period, the charging opportunities including vehicle to vehicle charging;

performing a multiple charging depot optimization analysis to generate a power grid peak hour profile, the power grid peak hour profile being configured to minimize charging vehicles at any of the plurality of charging depots experiencing peak hour demand;

performing a peak power optimization analysis to generate a vehicle charging profile, the vehicle charging profile being configured to activate a minimum number of chargers simultaneously and to minimize downtimes of the plurality of chargers to thereby distribute a power demand from the electric power grid and result in an initial peak power demand; and instructing a controller of each vehicle in the plurality of vehicles to cause the vehicle to either charge or supply energy back to the electric power grid at a time over the time period identified in the vehicle charging profile of each vehicle.

11. The method of claim 10, further comprising monitoring the mission schedule of each vehicle in the plurality of vehicles, a state-of-charge ("SOC") of the battery system of each vehicle in the plurality of vehicles, and a status of each charging depot in the plurality of charging depots to determine a current peak power demand from the electric power grid at various times during the time period.

12. The method of claim 10, further comprising determining an expected energy level required for each mission of each vehicle in the plurality of vehicles by evaluating a plurality of characteristics corresponding to the mission.

13. The method of claim 10, further comprising determining peak demand times during the time period for each of the plurality of charging depots where electricity rates charged for electricity from the grid are increased relative to other rates charged during the time period, wherein the vehicle charging profile is further configured to minimize vehicles charging at a charging depot that is experiencing peak demand.

14. The method of claim 13, further comprising determining a plurality of characteristics of a stationary energy storage ("SES") device coupled to the plurality of chargers and to the grid, and performing the multiple charging depot optimization and peak power optimization analysis by determining opportunities during the time period to use the SES device to power one or more vehicles chargers instead of the grid.

15. The method of claim 14, further comprising identifying opportunities during the time period to deliver energy from the SES device back to the grid at any of the plurality of charging depots experiencing peak demand.

16. A controller for determining a vehicle charging profile for use in charging a plurality of electric vehicles using a plurality of vehicle chargers at a plurality of charging depots that are coupled to an electric power grid, comprising:

a processor; and a memory storing software which when executed by the processor causes the processor to:

determine a plurality of characteristics of each of the plurality of vehicles, the plurality of characteristics including a charge capacity of a battery system of each vehicle, a mission schedule for each vehicle, and an ability to participate in vehicle to vehicle charging for each vehicle;

determine a plurality of characteristics of each of the plurality of chargers, the plurality of characteristics including a type of each charger and a charging capacity of each charger;

determine a plurality of characteristics of each of the plurality of charging depots, the plurality of characteristics including when each charging depot reaches peak demand hours;

process the plurality of characteristics of each of the plurality of vehicles, the plurality of characteristics of each of the plurality of chargers, and the plurality of characteristics of the plurality of charging depots to identify charging opportunities for each of the plurality of vehicles over the course of a time period;

perform a multiple charging depot optimization analysis to generate a power grid peak hour profile, the power grid peak hour profile being configured to minimize charging vehicles at any of the plurality of charging depots experiencing peak hour demand;

perform a peak power optimization analysis to generate a vehicle charging profile, the vehicle charging profile being configured to activate a minimum number of chargers simultaneously and to minimize down-times of the plurality of chargers to thereby distribute a power demand from the electric power grid and result in an initial peak power demand; and instructing a controller of each vehicle in the plurality of vehicles to cause the vehicle to either charge or supply energy back to the electric power grid at a time over the time period identified in the vehicle charging profile of each vehicle.

17. The controller of claim 16, wherein the processor determines a schedule to charge the plurality of vehicles by analyzing the plurality of characteristics of the vehicles, the plurality of characteristics of the plurality of chargers, and the plurality of characteristics of the charging depots to minimize activation of chargers during the peak demand times.

18. The controller of claim 17, wherein the processor further determines the schedule to charge the plurality of vehicles by determining when during the time period a vehicle can receive an excess charge to later give the excess charge to another vehicle in the plurality of vehicles.

19. The controller of claim 17, wherein the controller is configured to electronically couple to a stationary energy storage ("SES") device that is coupled to both the vehicle chargers and the grid;

wherein the controller instructs the SES device to give energy back to the grid during peak hours of the plurality of charging depots; and wherein the controller instructs the SES device to charge vehicles that need charging during peak hours of the plurality of charging depots.

20. The controller of claim 19, wherein the controller identifies each vehicle in the plurality of vehicles by a unique identifier;

wherein the unique identifier corresponds to a plurality of vehicle characteristics.

\*    \*    \*    \*    \*